(12) United States Patent
Sasaki et al.

(10) Patent No.: US 8,659,720 B2
(45) Date of Patent: Feb. 25, 2014

(54) BACKLIGHT DEVICE AND LIQUID CRYSTAL DISPLAY

(75) Inventors: Tsuyoshi Sasaki, Kanagawa-ken (JP);
Mikio Okumura, Kanagawa-ken (JP);
Koichi Kamiyama, Tokyo-to (JP);
Makoto Ashihara, Kanagawa-ken (JP)

(73) Assignee: JVC Kenwood Corporation, Yokohama-shi, Kanagawa (JP)

(*) Notice: Subject to any disclaimer, the term of this patent is extended or adjusted under 35 U.S.C. 154(b) by 0 days.

(21) Appl. No.: 13/459,738

(22) Filed: Apr. 30, 2012

(65) Prior Publication Data

US 2012/0212690 A1    Aug. 23, 2012

Related U.S. Application Data

(62) Division of application No. 12/656,875, filed on Feb. 18, 2010.

(30) Foreign Application Priority Data

Feb. 19, 2009  (JP) .............................. P2009-036556
Mar. 10, 2009  (JP) .............................. P2009-056366

(51) Int. Cl.
*G02F 1/1335* (2006.01)

(52) U.S. Cl.
USPC ................................ 349/64; 349/65; 349/66

(58) Field of Classification Search
USPC ..................................................... 349/64–66
See application file for complete search history.

(56) References Cited

U.S. PATENT DOCUMENTS

| | | | | |
|---|---|---|---|---|
| 7,059,736 B2* | 6/2006 | Yu et al. | | 362/97.1 |
| 7,264,364 B2* | 9/2007 | Chen et al. | | 362/29 |
| 7,431,475 B2* | 10/2008 | Hafuka et al. | | 362/218 |
| 7,510,318 B2* | 3/2009 | Chen | | 362/634 |
| 7,542,108 B2* | 6/2009 | Saito et al. | | 349/64 |
| 7,766,500 B2* | 8/2010 | Takata | | 362/97.4 |
| 7,883,230 B2* | 2/2011 | Kim et al. | | 362/97.1 |
| 2002/0113924 A1* | 8/2002 | Saito et al. | | 349/112 |
| 2004/0189892 A1* | 9/2004 | Ono et al. | | 349/64 |
| 2004/0257792 A1* | 12/2004 | Yu et al. | | 362/31 |

(Continued)

FOREIGN PATENT DOCUMENTS

JP    59-8809 B2    2/1984
JP    05-119313 A    5/1993

(Continued)

OTHER PUBLICATIONS

Official Action issued on Jan. 15, 2013, in the counterpart Japanese application No. 2009-036556.

*Primary Examiner* — Kaveh Kianni
(74) *Attorney, Agent, or Firm* — Nath, Goldberg & Meyer; Jerald L. Meyer; Stanley N. Protigal

(57) ABSTRACT

A backlight device includes a housing, a light source, a diffuse plate and a fixing member. The housing has an open surface. The light source is arranged in the housing. The diffuser plate is arranged on the open surface of the housing and allows light emitted from the light source to pass therethrough while diffusing the light. The fixing member prevents the diffuser plate from bending in a direction in which light passes through the diffuser plate. A part of the fixing member has transmittance adjusted to substantially equalize luminance distribution of light passed through the diffuser plate.

10 Claims, 25 Drawing Sheets

(56) References Cited

U.S. PATENT DOCUMENTS

| | | | |
|---|---|---|---|
| 2005/0140843 A1* | 6/2005 | Shimizu | 349/58 |
| 2005/0146898 A1* | 7/2005 | Wu et al. | 362/632 |
| 2006/0034090 A1* | 2/2006 | Chen et al. | 362/390 |
| 2007/0019419 A1* | 1/2007 | Hafuka et al. | 362/373 |
| 2007/0127272 A1* | 6/2007 | Yang et al. | 362/634 |
| 2007/0138936 A1* | 6/2007 | Chang | 313/493 |
| 2007/0210694 A1* | 9/2007 | Kim et al. | 313/493 |
| 2008/0019145 A1* | 1/2008 | Cho et al. | 362/601 |
| 2008/0136994 A1* | 6/2008 | Lee et al. | 349/58 |
| 2008/0225556 A1* | 9/2008 | Chen | 362/634 |
| 2009/0080179 A1* | 3/2009 | Takata | 362/97.1 |
| 2010/0045890 A1* | 2/2010 | Kamada | 349/58 |
| 2010/0165466 A1* | 7/2010 | Endo et al. | 359/599 |
| 2010/0177030 A1* | 7/2010 | Kuromizu | 345/102 |

FOREIGN PATENT DOCUMENTS

| | | | | |
|---|---|---|---|---|
| JP | 2003-203503 A | 7/2003 | | |
| JP | 2003-215585 A | 7/2003 | | |
| JP | 2004039476 A | 2/2004 | | |
| JP | 2004186080 A | 7/2004 | | |
| JP | 2004264452 A | 9/2004 | | |
| JP | 2005-117023 A | 4/2005 | | |
| JP | 2005268142 A * | 9/2005 | | F21V 8/00 |
| JP | 2006086100 A | 3/2006 | | |
| JP | 2007109608 A | 4/2007 | | |
| JP | 2007123125 A | 5/2007 | | |
| JP | 4009263 B2 | 9/2007 | | |
| JP | 2007299669 A | 11/2007 | | |
| JP | 2008027885 A | 2/2008 | | |
| JP | 2010015753 A | 1/2010 | | |

* cited by examiner

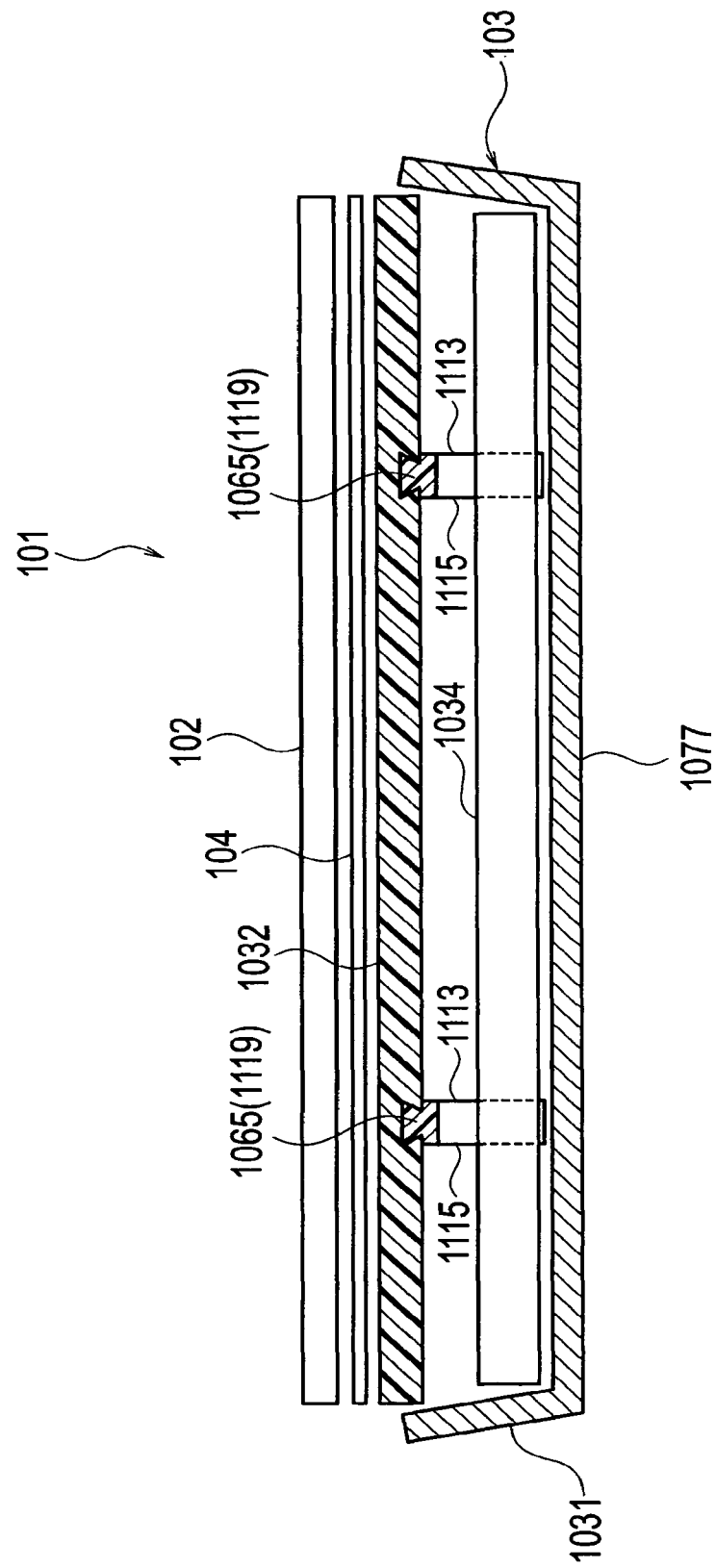

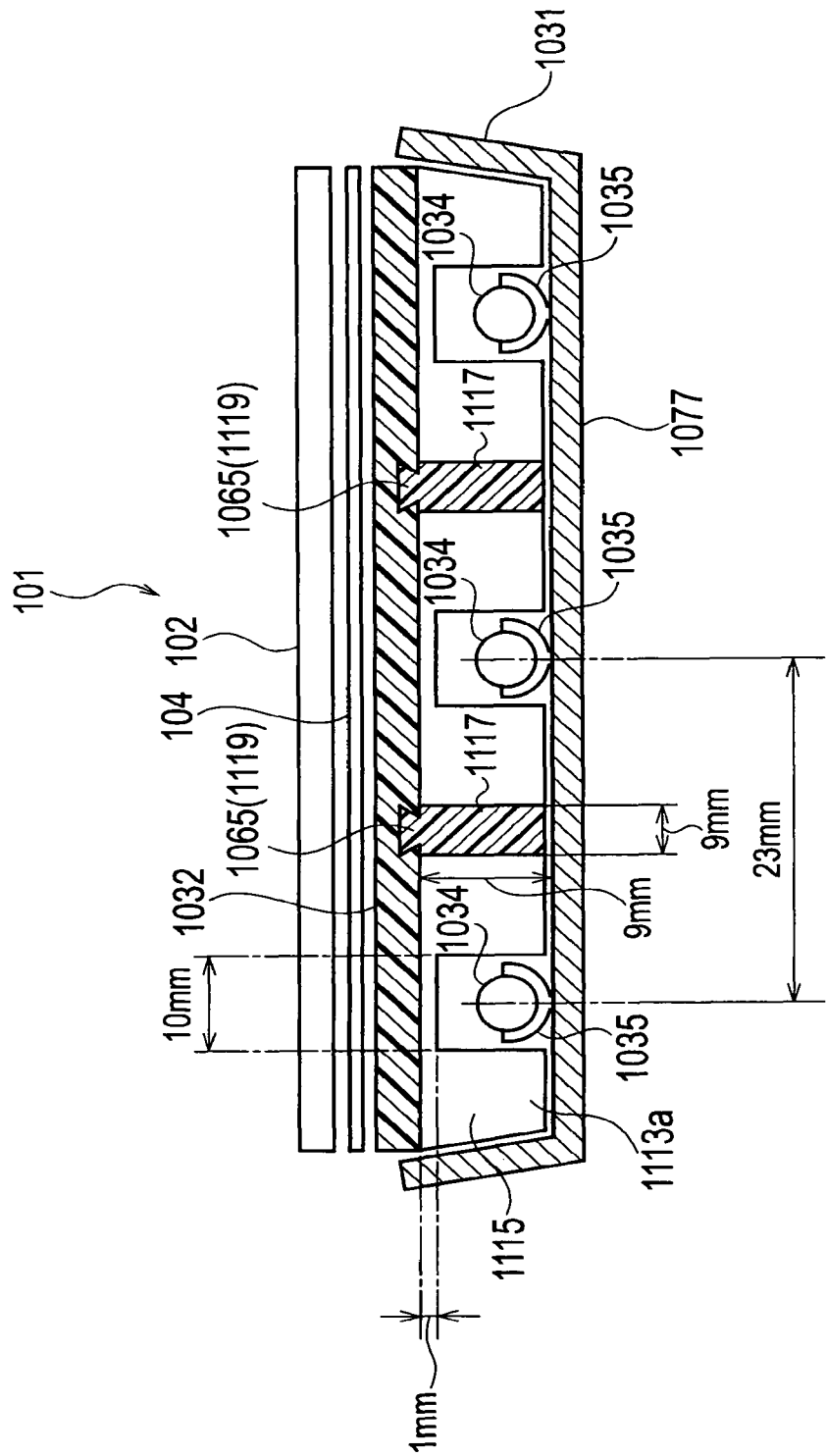

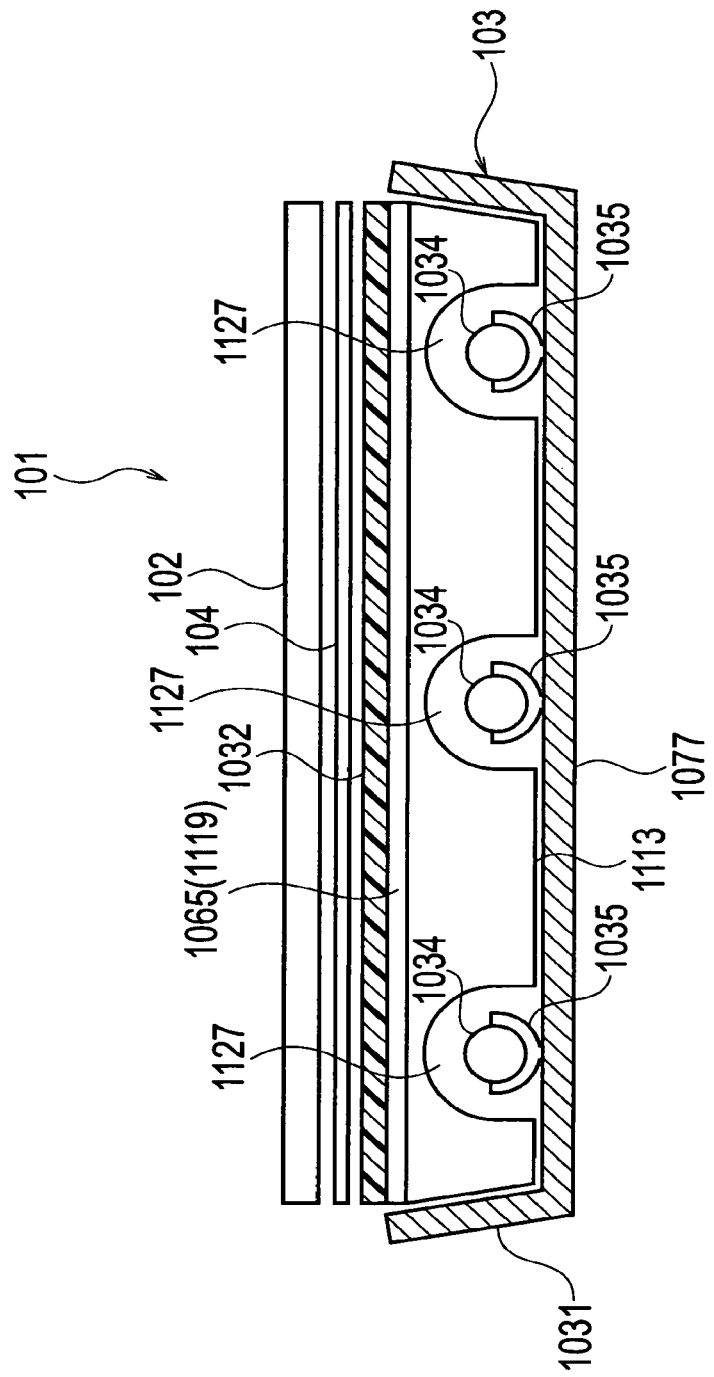

BACKLIGHT DEVICE AND LIQUID CRYSTAL DISPLAY

RELATED APPLICATIONS

The present patent application is a Divisional application of U.S. patent application Ser. No. 12/656,875 filed Feb. 18, 2010, which is assigned to the assignee hereof and which is incorporated by reference herein.

BACKGROUND

1. Field

The present disclosure relates to a backlight device and a liquid crystal display provided with the backlight device.

2. Description of the Related Art

As an apparatus for displaying an image or a video, a liquid crystal display (LCD) spreads widely. Recently, demands for enlarging a screen (liquid crystal panel) of a liquid crystal display and thinning a main body of liquid crystal display increase.

Since a liquid crystal does not emit light by itself, the liquid crystal display displays an image using an emitting device (backlight device) arranged in back of the liquid crystal panel.

As a light source used in the backlight device, a point light source such as a light emission diode (LED) or a line light source such as a cold cathode fluorescent lamp (CCFL) are cited generally.

The backlight device is classified into an edge-light type, a just-below type or the like according to a position where the light source is arranged.

The just-below type backlight device arranges light sources just in back of the liquid crystal panel at predetermined intervals. This backlight device emits apparent surface-light by allowing light emitted from the light sources to pass through a diffuser plate arranged in back of the liquid crystal panel. In this case, light intensity is relatively high in regions adjacent to the light sources and decreases with increasing distance from the light sources. If the back light device does not uniform light intensity therein, when surface-light is emitted from the light sources, a lamp image (light-dark pattern) due to the light sources appears on the screen of the liquid crystal display.

Especially, if a distance between the light sources and the diffuser plate is short to thin the backlight device, a lamp image appears on the screen of liquid crystal display remarkably. This deteriorates image quality of the liquid crystal display.

As means for eliminating a lamp image, means using a lighting curtain has been known. For example, the means is disclosed in a patent document 1 (Japanese Published Unexamined Application No. S59 (1984)-8809).

However, if a light blocking pattern of the lighting curtain is not in a right position with respect to light sources, the means can not completely eliminate a lamp image using a diffuser sheet (diffuser plate) or an optical sheet such as a prism sheet. This causes luminance on a screen of a liquid crystal display including the means to lack in uniformity.

For the means, due to deflection of the lighting curtain or thermal expansion or contraction of the lighting curtain by increase in temperature at a time when the light sources produce heat, a distance between the lighting curtain and one light source differs from one between the lighting curtain and another light source. This also causes luminance on the screen of the liquid crystal display to lack in uniformity.

When a liquid crystal display is relatively small, a diffuser plate does not bend by its own weight. However, a recent liquid crystal display is relatively large to meet a demand for enlarging a screen (liquid crystal panel) of liquid crystal display. As a liquid crystal display becomes large, a diffuser plate is also getting larger. This causes the diffuser plate to bending by its own weight.

In order to prevent the lighting curtain and/or the diffuser plate from bending by its own weight, means for using spacers to keep distances between a lighting curtain (or diffuser plate) and light sources constant has been known. For example, the means is disclosed in a patent document 2 (Japanese Published Unexamined Application No. 2003-203503). However, although preventing the lighting curtain (or diffuser plate) from bending toward a light source side of a liquid crystal display including the means, the spacer can not prevent the light curtain (or diffuser plate) from bending toward a liquid crystal panel side of the liquid crystal display. In addition, if the light curtain (or diffuser plate) bends toward the liquid crystal panel side, there is a possibility that an optical sheet attached to the diffuser plate contacts with the liquid crystal panel to damage the liquid crystal panel.

In order to prevent the lighting curtain and/or the diffuser plate from bending toward the liquid crystal panel side, a way of attaching heads of the spacers to the lighting curtain and/or the diffuser plate using an adhesive agent, a double-faced tape or the like has been proposed. In this case, each head of spacer needs to have a large surface area to get adhesive strength. If a surface area of each head of spacer is relatively large, this deteriorates visibility on a screen of a liquid crystal display. Namely, luminance on a part of the screen corresponding to attachment regions where the spacers are attached to the lighting curtain and/or the diffuser plate is lower than one on the other parts of the screen corresponding to regions other than the attachment regions.

In addition, in this way, the heads of spacers completely constrain variations in a thickness direction and a direction (in-plane direction) perpendicular to the thickness direction of the lighting curtain and/or the diffuser plate. When expansion or contraction of the lighting curtain and/or the diffuser plate by increase in temperature at a time when the light sources produce heat or usage environment occurs, the lighting curtain and/or the diffuser plate deforms (bends) in the thickness direction around the attachment regions because there are not clearances. This deformation causes a distance between the lighting curtain (or diffuser plate) and one light source to differ from one between the lighting curtain (or diffuser plate) and another light source in the regions other than the attachment regions. This deteriorates visibility on the screen of the liquid crystal display.

In order to prevent the lighting curtain and/or the diffuser plate from bending toward the liquid crystal panel side, another way of attaching fixing members standing from a back frame to the lighting curtain and/or the diffuser plate using an adhesive agent, a double-faced tape or the like has been proposed. This way is disclosed in a patent document 3 (Japanese Published Unexamined Application No. H5 (1993)-119313). However, once the fixing members are attached to the lighting curtain and/or the diffuser plate using an adhesive agent, a double-faced tape or the like, when a backlight device is taken apart in order to exchange a lamp or the like, there is a possibility that it is difficult to take apart the backlight device. Thus, the fixing members completely constrain variations in a thickness direction and a direction (in-plane direction) perpendicular to the thickness direction of the lighting curtain and/or the diffuser plate. As the above-described, when expansion or contraction of the lighting curtain and/or the diffuser plate by increase in temperature at a time when the light sources produce heat or usage environment occurs, the lighting curtain and/or the diffuser plate deforms (bends) in the thickness direction around the attachment regions because there are not clearances. This deformation causes a distance between the lighting curtain (or diffuser plate) and one light source in the attachment regions to differ from one between the lighting curtain (or diffuser plate) and another light source in the regions other than the attachment regions. This deteriorates visibility on a screen of a liquid crystal display.

In order to prevent the lighting curtain and/or the diffuser plate from bending toward the liquid crystal panel side, an alternative way of attaching the fixing members to the lighting curtain and/or the diffuser plate through transparent holes has been proposed. This way is disclosed in a patent document 4 (Japanese Patent Publication No. 4009263).

In this way, the fixing members are made of transparent material not to interfere in light to be entering the diffuser plate, and are respectively inserted into transparent holes which penetrate the semi-transparent diffuser plate.

However, if the whole fixing member is made of transparent material, when light has passed through the fixing member to reach a surface of the backlight device without being diffused in the diffuser plate, this causes light leaking. As a result, even if a part of light emitted from the light sources, which has passed through the fixing members to reach the surface of the backlight device, passes through the optical sheet, one or more bright regions (one or more regions where luminance is relatively high) appear on the liquid crystal panel due to the part of light. This causes luminance on the screen of the liquid crystal display to lack in uniformity.

Thus, it is difficult for the alternative way to keep uniformity of luminance on the screen of the liquid crystal display while preventing the diffuser plate from bending toward the liquid crystal panel side.

In order to prevent the lighting curtain and/or the diffuser plate from bending toward the liquid crystal panel side, a way of using not the spacers and the fixing members but instead ribs has been known. This way is disclosed in a patent document 5 (Japanese Published Unexamined Application No. 2003-215585). However, it is difficult to prevent the lighting curtain and/or the diffuser plate from bending toward the liquid crystal panel side using the ribs, with respect to a liquid crystal display including a large and thin liquid crystal panel more than or equal to 37 inches and a backlight device being about 10 mm thick. Even if the ribs are thickened to increase rigidity of diffuser plate, the ribs interfere in light emitted from the light sources. This causes luminance on the screen of the liquid crystal display to lack in uniformity, which deteriorates quality of the liquid crystal display.

In addition, in a conventional backlight device in which supporting members are employed to increase arrangement accuracy of the diffuse plate to prevent luminance on the diffuser plate from lacking in uniformity, there is a possibility of causing luminance on a part of the diffuser plate corresponding to engagement portions where the supporting members are engaged to the diffuser plate and adjacent portions around the engagement portions, to lack in uniformity. This problem also occurs when reinforcing members are installed to increase rigidity of the diffuse plate for preventing the diffuser plate from bending toward the liquid crystal panel side.

SUMMARY

The disclosed techniques were developed in order to solve the above-described problems, and has an object to provide a backlight device that prevents luminance on a diffuser plate from lacking in uniformity while keeping a distance between the diffuser plate and a light source constant, and a liquid crystal display provided with the backlight device.

The present disclosure has another object to provide a backlight device that prevents luminance on a part of a diffuser plate corresponding to an engagement portion where a supporting member is engaged to a diffuser plate and/or a reinforcing member is engaged to the diffuser plate and an adjacent portion around the engagement portion, from lacking in uniformity, and a liquid crystal display provided with the backlight device.

A first described configuration provides a backlight device comprising: a housing that has an open surface; a light source that is arranged in the housing; a diffuser plate that is arranged on the open surface of the housing and allows light emitted from the light source to pass therethrough while diffusing the light; and a bending prevention member that prevents the diffuser plate from bending in a direction in which light passes through the diffuser plate, wherein a part of the bending prevention member has transmittance adjusted to substantially equalize luminance distribution of light passed through the diffuser plate.

A second described configuration provides the backlight device according to the first described configuration, wherein one end portion of the bending prevention member is engaged to a transparent hole formed on the diffuser plate.

A third described configuration provides the backlight device according to the second described configuration, wherein the one end portion of the banding prevention member is made of material with transmittance equal to or lower than one of the diffuser plate.

A fourth described configuration provides a backlight device comprising: a housing that has an open surface; a light source that is arranged in the housing; a diffuser plate that is arranged on the open surface of the housing, has a recessed portion on a surface of a light source side and allows light emitted from the light source to pass therethrough while diffusing the light; and a supporting member that has one end portion engaged to the recessed portion of the diffuser plate and the other end portion engaged to the housing.

A fifth described configuration provides the backlight device according to the fourth described configuration, wherein a part of the supporting member is made of light transmissive member in a region other than regions where the supporting member is engaged to the diffuser plate and the housing.

A sixth described configuration provides the backlight device according to the fourth described configuration, wherein an optical characteristic agent is filled in clearance between the supporting member and the diffuser plate in a region where the supporting member is engaged to the diffuser plate.

A seventh described configuration provides the backlight device according to the fourth described configuration, wherein a width of cross-sectional shape in the recessed portion of the diffuser plate is narrow in a region where light enters the diffuser plate.

An eighth described configuration provides the backlight device according to the fourth described configuration, wherein the light source is a line light source, the supporting member extends in a direction which intersects with the light source and is mounted at the light source side of the diffuser plate, and a protruding length of the supporting member from the diffuser plate is relatively small in a region adjacent to the light source and relatively large in a region away from the light source.

A ninth described configuration provides a liquid crystal display comprising: a backlight device comprising: a housing that has an open surface; a light source that is arranged in the housing; a diffuser plate that is arranged on the open surface of the housing and allows light emitted from the light source to pass therethrough while diffusing the light; and a bending prevention member that prevents the diffuser plate from bending in a direction in which light passes through the diffuser plate, wherein a part of the bending prevention member has transmittance adjusted to substantially equalize luminance distribution of light passed through the diffuser plate; an optical sheet that is arranged in a position where light emitted from the light source has passed through the diffuser plate; and a liquid crystal panel that is arranged in a position where light has passed through the optical sheet.

A tenth described configuration provides a liquid crystal display comprising: a backlight device comprising: a housing that has an open surface; a light source that is arranged in the housing; a diffuser plate that is arranged on the open surface of the housing, has a recessed portion on a surface of a light source side and allows light emitted from the light source to pass therethrough while diffusing the light; and a supporting member that has one end portion engaged to the recessed portion of the diffuser plate and the other end portion engaged to the housing.

According to the present disclosure, the backlight device and the liquid crystal display provided with the backlight device prevent luminance on the diffuser plate from lacking in uniformity while keeping a distance between the diffuser plate and the light source constant.

According to the present disclosure, the backlight device and the liquid crystal display provided with the backlight device prevent luminance on a part of the diffuser plate corresponding to the engagement portion where the supporting member is engaged to the diffuser plate and/or the reinforcing member is engaged to the diffuser plate and the adjacent portion around the engagement portion, from lacking in uniformity.

BRIEF DESCRIPTION OF THE DRAWINGS

FIG. 22 is a cross-sectional diagram due to a line XXII-XXII shown in FIG. 20.

FIG. 24 is a cross-sectional diagram of a liquid crystal display in which the diffuser plate shown in FIG. 7 is provided with lattice-shaped reinforcing members.

FIG. 30 is a cross-sectional diagram of a modification of the liquid crystal display shown in FIG. 21.

DETAILED DESCRIPTION

Figure 1:
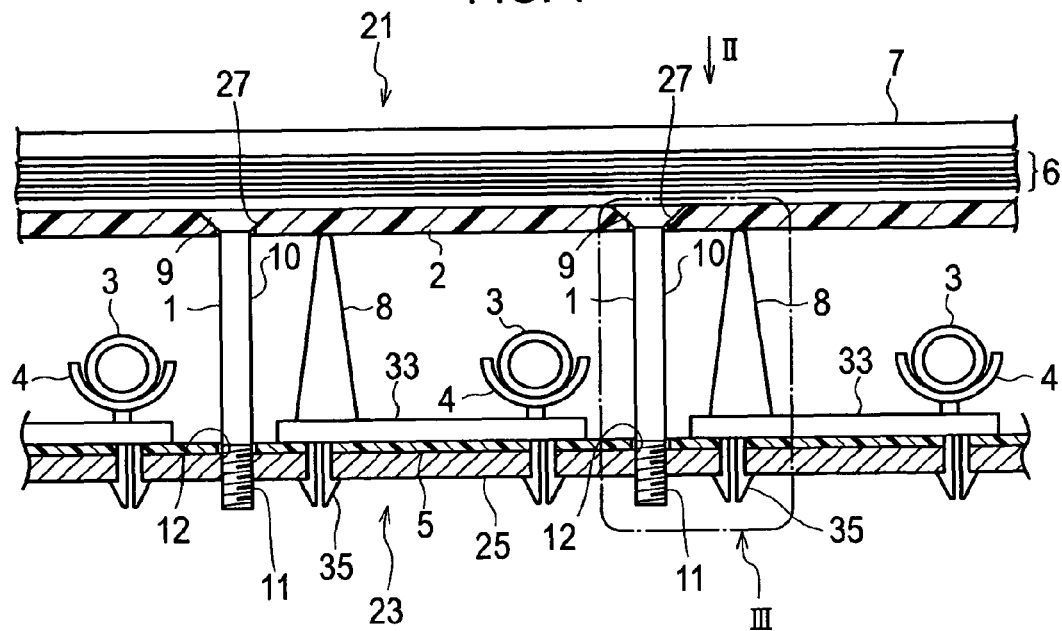
FIG. 1 is a schematic cross-sectional diagram of a liquid crystal display according to a first described configuration of the present disclosure.

Described configurations of the present disclosure will be described below, with reference to FIGS. 1 to 30. Although each described configuration illustrates a liquid crystal display provided with a backlight device in which line light sources such as cold cathode fluorescent lamps (CCFLs) are employed, the liquid crystal display may be provided with a backlight device in which point light sources such as light-emitting diodes (LEDs) are employed, instead of the backlight device including the line light sources therein.

(First Described Configuration)

A liquid crystal display 21 includes optical sheets 6, a liquid crystal panel 7 and a backlight device 23. Each optical sheet 6 is composed of a polarized reflection film or the like and arranged in front of a diffuser plate 2 of the backlight device 23. The liquid crystal panel 7 is arranged in front of the optical sheets 6. Light emitted from the backlight device 23 passes though the diffuser plate 2 and the optical sheets 6 to illuminate the liquid crystal panel 7. The liquid crystal display 21 drives the liquid crystal panel 7 using a driving device or the like (not shown), and modulates light emitted from the backlight device 23 to carry out gradation process, which allows various images to be displayed thereon. It is noted that the upper side of FIG. 1 corresponds to a front side of the liquid crystal display 21 and the lower side of FIG. 1 corresponds to a rear side of the liquid crystal display 21.

The backlight device 23 includes fixing members 1, the diffuser plate 2, CCFLs 3, lamp holders 4, a reflector plate (reflector member) 5, spacers 8, a housing (open case) 25, base plate portions 33 and engagement portions 35.

The housing 25 is formed in a rectangular box shape. The CCFLs 3 are formed in cylindrical shapes and arranged in the housing 25 so as to be located at a bottom side of the housing 25. Each CCFL 3 is mounted via each lamp holder 4 on the reflector member 5 attached on the bottom of housing 25. The CCFLs 3 are arrayed in a lateral or longitudinal direction of the housing 25 so as to be opposed to a whole surface of the reflector member 5 (a bottom surface of the housing 25). A distance between one CCFL 3 and the reflector member 5 has a certain value and is equal to one between another CCFL 3 and the reflector member 5

The diffuser plate 2 is a milky-white rectangular flat plate and arranged in front of the CCFLs 3 (at a side opposed to the bottom side of the housing 25 with respect to the CCFLs 3; at an open side of the housing 25). Namely, the diffuser plate 2 is arranged on an open surface of housing 25 to close the housing 25. The diffuser plate 2 is about 2 mm thick and made of acrylic (polymethylmethacrylate: PMMA), polycarbonate (PC), polystyrene (PS) or the like in which diffuser material is contained.

The reflector member 5 is arranged in back of the CCFLs 3. It is noted that FIG. 1 illustrates bottom plates of the reflector member 5 and the housing 25 and does not illustrate side plates of the reflector member 5 and the housing 25. The diffuser plate 2, the optical sheets 6 and the liquid crystal panel 7 are mounted to the housing 25 such that they close the open surface of housing 25 and their thickness directions correspond to a front-back direction of the backlight device 23.

The fixing members 1 and the spacers 8 are included in the backlight device 23. Each fixing member 1 is a rod-like member (circular or polygonal columnar member) for preventing the diffuser plate 2 from bending. Each fixing member 1 has one end portion (an upper end portion shown in FIGS. 1 and 3) in a longitudinal direction thereof which is engaged to a transparent hole (through hole) 27 formed by piercing the diffuser plate 2. Each fixing member 1 has the other end portion (a lower end portion shown in FIGS. 1 and 3) in the longitudinal direction thereof which extends from the diffuser plate 2 toward a back side of the backlight device 23 and is engaged to the housing 25. Under this configuration, the fixing members 1 pull the diffuser plate 2 toward the back side of the backlight device 23 to prevent the diffuser plate 2 from bending toward the front side of the backlight device 23 (a transparent direction of light emitted from the CCFLs 3).

Each spacer 8 is formed in a rod-like shape (e.g., tall conical shape) and mounted on the bottom side of the housing 25. The spacers 8 contact with the diffuser plate 2 at the vertices thereof to prevent the diffuser plate 2 from bending toward the back side of the backlight device 23 (CCFLs's side).

Transmittance of at least a part of each fixing member 1 (transmittance of visible light emitted from the CCFLs 3) is adjusted so as to substantially equalize luminance distribution on the diffuser plate 2 due to light emitted from the CCFLs 3.

More specifically, a connection portion (engagement portion) 9 of each fixing member 1 engaged to each through hole 27 of the diffuser plate 2 is made of the same material as the diffuser plate 2 is made of.

Figure 3:
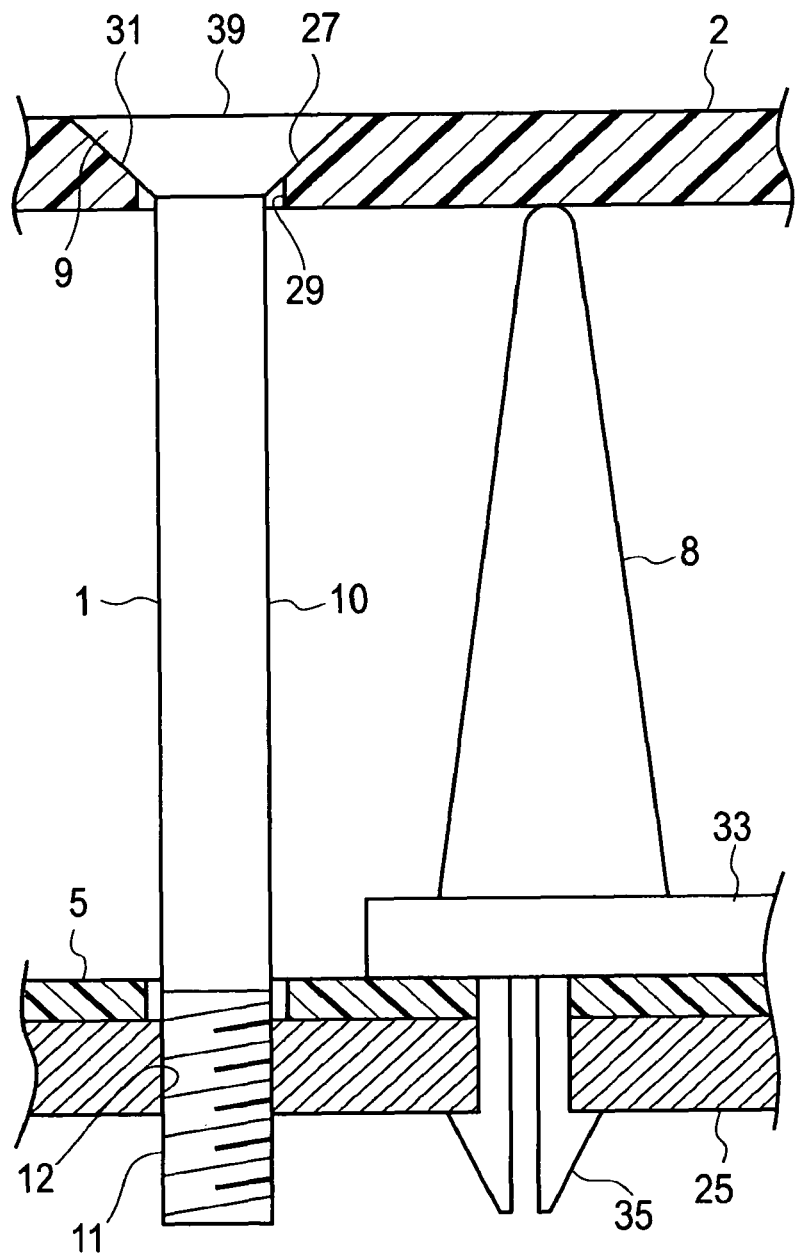
FIG. 3 is an enlarged cross-sectional diagram of a part III shown in FIG. 1.

As shown in FIG. 3, each fixing member 1 is connected to a truncated-cone-like counterbore portion 31 formed by carrying out counterbore processing on the diffuser plate 2, via a cylindrical transparent hole 29 formed by piercing the diffuser plate 2.

Each fixing member 1 includes the engagement portion 9 engaged to the counterbore portion 31 of which inclined surfaces cross each other at right angles when viewed from the cross section thereof (see FIG. 3), a fixed portion 11 fixed to the reflector member 5, and a linking portion 10 linking the engagement portion 9 to the fixed portion 11. Each fixing member 1 has the engagement portion 9 as a head portion formed in a countersunk-screw-like shape.

In light of the thickness of diffuser plate 2, the engagement portion 9 is formed in a tapered shape so as to be firmly engaged to the diffuser plate 2 with a larger cross-sectional area.

The material constituting the engagement portion 9 is adjusted to have the same transmittance as the diffuser plate 2 such that each fixing member 1 does not affect light directly emitted from the CCFLs 3 to enter the diffuser plate 2 and light emitted from the CCFLs 3 and then reflected on the reflector plate 5 to enter the diffuser plate 2 (that is, luminance on the diffuser plate 2 does not lack in uniformity due to each fixing member 1).

For example, when transmittance of the diffuser plate 2 is set to 50%, transmittance of the engagement portion 9 is also set to about 50%. This prevents luminance on the diffuser plate 2 from lacking in uniformity. In this case, it is desirable to apply optical coupling agent such as silicone grease on the diffuser plate 2 and the engagement portion 9 to keep optical continuous state on the diffuser plate 2 and the engagement portion 9. Transmittance of the engagement portion 9 (or a part of the engagement portion 9) may be set to be lower than one of the diffuser plate 2.

It is desirable that the linking portion 10 and the fixed portion 11 are made of transparent members so as not to affect light entering the diffuser plate 2 from the CCFLs 3 and the reflector member 5. The fixing member 1 may be manufactured as integral fixing member by two-color injection molding.

In order to fix each fixing member 1 to the reflector member 5, a male screw formed at a distal end of the fixed portion 11 is screwed into a screw hole 12 formed on the reflector member 5 with tap processing.

Configuration of the backlight device 23 will further be described.

A pair of lamp holder 4 and spacer 8 on each based plate portion 33 is formed in single-piece by mold forming. More specifically, the lamp holder 4 and the spacer 8 are integrated each other via the based plate portion 33 formed in a rectangular flat plate shape. The spacer 8 extends from one surface in a thickness direction of the base plate portion 33 at one end region in a longitudinal direction of the base plate portion 33.

The lamp holder 4 extends from one surface in the thickness direction of the base plate portion 33 at the other end region in the longitudinal direction of the base plate portion 33. Two umbrella engagement portions 35 extend from the other surface in the thickness direction of the base plate portion 33 at one end region and the other end region in the longitudinal direction of the base plate portion 33. The engagement portions 35 are engaged with through holes formed in the reflector member 5 and the housing 25, which allows the lamp holder 4, the spacer 8 and the base plate portion 33 to be integrally mounted to the reflector member 5 and the housing 25.

Figure 2:
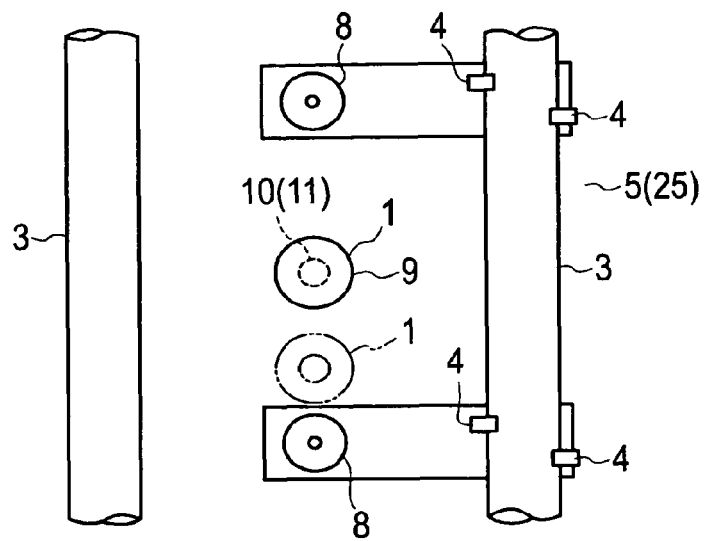
FIG. 2 is a diagram viewed from a direction of arrow II shown in FIG. 1.

In FIGS. 1 and 3, a fixing member 1 and a spacer 8 adjacent to the fixing member 1 are drawn so as not to overlap each other from a lateral view of the backlight device 23 (that is, as viewed from a direction along which the CCFLs 3 are aligned at certain intervals), for convenience sake. Actually, as shown in FIG. 2, a fixing member 1 and a spacer 8 adjacent to the fixing member 1 are arranged so as to overlap each other from the lateral view of the backlight device 23. It is noted that as shown in FIGS. 1 and 3, a fixing member 1 and a spacer 8 adjacent to the fixing member 1 may be arranged so as not to overlap each other from the lateral view of the backlight device 23.

As shown in FIG. 2, in a direction along which adjacent CCFLs 3 are aligned at certain intervals (the horizontal direction in FIG. 2), a fixing member 1 and a spacer 8 adjacent to the fixing member 1 are arranged in the center of region between the adjacent CCFLs 3. In a longitudinal direction of CCFL 3 (the vertical direction in FIG. 2), a fixing member 1 is arranged in the center of region between adjacent spacers 8 aligned at a certain interval. It is noted that as indicated by two-dot chain line in FIG. 2, a fixing member 1 may be located in the vicinity of a spacer 8.

According to the backlight device 23, each fixing member 1 has one end portion which is engaged to a transparent hole 27 formed by piercing the diffuser plate 2 to prevent the diffuser plate 2 from bending toward the front side of the backlight device 23, and transmittance of at least a part of each fixing member 1 is adjusted so as to substantially equalize luminance distribution on the diffuser plate 2. This allows an interval between the diffuser plate 2 and each CCFL 3 to be kept at a certain value and prevents luminance in the backlight device 23 from lacking in uniformity.

Namely, the fixing members 1 prevent the diffuser plate 2 with a tendency of deflection to increase as the liquid crystal display 21 becomes larger and thinner, from bending toward a side opposed to the CCFLs's side, which allows an interval between the diffuser plate 2 and each CCFL 3 to be kept at a certain value. This prevents luminance due to light diffused in the diffuser plate 2 on the diffuser plate 2 from lacking in uniformity. Therefore, even if the backlight device 23 is applied in the liquid crystal display 21, there is a low probability that the bent diffuser plate 2 contacts with the liquid crystal panel 7 to damage the liquid crystal panel 7.

According to the backlight device 23, each fixing member 1 has a two-color formation to adjust transmittance of light (for example, the engagement portion 9 of the fixing member 1 is made of semi-transparent material and the other portions of the fixing member 1 is made of transparent material), which keeps uniformity of luminance on the diffuser plate 2. Namely, a part of light emitted from the CCFLs 3 passes through a space in the housing 25 and the diffuser plate 2 (a part of the diffuser plate 2 which is not engaged to the fixing members 1) to arrive in front of the diffuser plate 2. The other part of light emitted from the CCFLs 3 passes through the transparent linking portions 10 of the fixing members 1 and the semi-transparent engagement portions 9 of the fixing members 1 to arrive in front of the diffuser plate 2. When light passes through the engagement portions 9, light intensity is appropriately reduced. This prevents luminance on the engagement portions 9 of the fixing members 1 from increasing in comparison with luminance on the diffuser plate 2, which prevents luminance in the backlight device 23 from lacking in uniformity.

The backlight device 23 shown in FIGS. 1 to 3 has a configuration in which a transmittance difference between a part of each fixing member 1 and the diffuser plate 2 is eliminated. Generally, in order to assemble each fixing member 1 and the diffuser plate 2, it is considered to engage or screw each fixing member 1 to or into the diffuser plate 2 by forming each through hole in the diffuser plate 2. This configuration however lacks in uniformity of light diffusion effect due to each through hole of the diffuser plate 2. In contrast, the backlight device 23 reduces deflection of the diffuser plate 2 using the fixing members 1 and adjusts transmittance of the engagement portions 9 of the fixing members 1 to match transmittance of the diffuser plate 2 by making the engagement portions 9 with semi-transparent material. This configuration allows light emitted from the CCFLs 3 to pass through the diffuser plate 2, the fixing members 2 and the engagement portions 9 and illuminate the liquid crystal panel 7, which keeps uniformity of light emitted from the diffuser plate 2 to the liquid crystal panel 7. This prevents luminance on the diffuser plate 2 from lacking in uniformity.

Thus, according to the backlight device 23, the fixing members 1 of which transmittance of the engagement portions 9 is adjusted to match transmittance of the diffuser plate 2 are fixed on the reflector members 5 (housing 25) and prevent the diffuser plate 2 from bending at the side opposed to the CCFLs's side. This configuration reduces lack of uniformity of luminance in the liquid crystal display 21 and prevents the diffuser plate 2 from contacting with the liquid crystal panel 7 to damage the liquid crystal panel 7.

Material of the fixing members 1 or the spacers 8 may be selected without restriction. Especially, when material such as resin material with a certain elastic modulus is selected, even if external force such as vibration or drop impact is applied to the backlight device 23, the fixing members 1 or the spacers 8 is not destroyed. This increases reliability of the backlight device 23.

Figure 4:
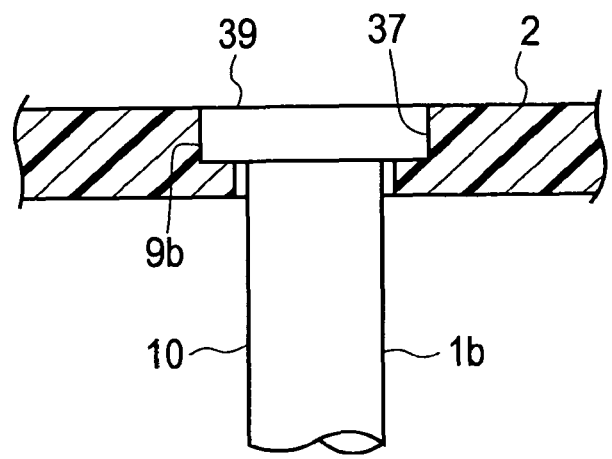
FIG. 4 is a cross-sectional diagram of a modified fixing member of the liquid crystal display shown in FIG. 1.

The fixing members 1 may be appropriately modified. For example, even if each fixing member 1 is modified as shown in FIG. 4, the same effect as the above-described effect can be obtained.

Each fixing member 1b includes a disc-like engagement portion 9b engaged to a cylindrical counterbore portion 37 formed in the diffuser plate 2, a fixed portion (not shown) fixed to the reflector member 5, and a linking portion 10 linking the engagement portion 9b to the fixed portion. It is noted that engagement of the fixing member 1b and the reflector member 5 and material of the engagement portion 9b are the same as the engagement and the material illustrated in FIGS. 1 to 3.

In view of a thickness (e.g., 2 mm) of the diffuser plate 2, a depth of each counterbore portion 37 is determined while an adequate thickness of the diffuser plate 2 is remained at the position where each counterbore portion 37 is formed such that the fixing members 1b fully support the diffuser plate 2. For example, it is desirable to set to about 0.5 mm an adequate thickness of diffuser plate 2 at the position where each counterbore portion 37 is formed. Namely, it is desirable to set to about 1.5 mm a depth of each counterbore portion 37.

Figure 5:
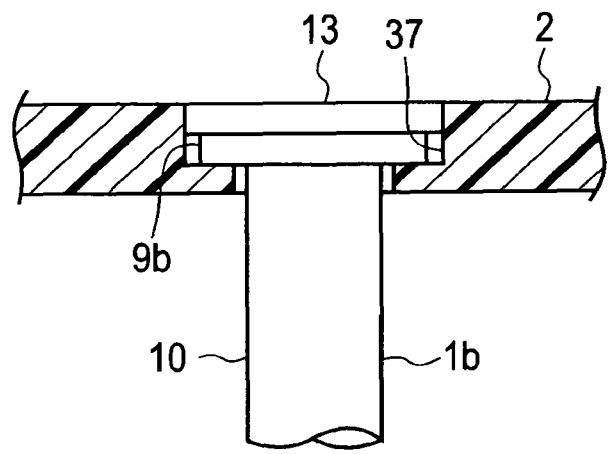
FIG. 5 is a cross-sectional diagram of a modified fixing member of the liquid crystal display shown in FIG. 1.

As shown in FIG. 5, a disc member 13 may be embedded into each counterbore portion 37. Under a situation where a disc member 13 is embedded into a counterbore portion 37, an engagement portion 9b of a fixing member 1b is hidden in the counterbore portion 37 as viewed from a front side of the diffuser plate 2 (above in FIG. 5).

Material of each disc member 13 is adjusted to have the same transmittance as the diffuser plate 2 has in order to prevent from being affected by the fixing members 1b light entering the diffuser plate 2 from the CCFLs 3 and the reflector member 5. It is desirable to make each disc member 13 of the material of which the diffuser plate 2 is made. This substantially matches transmittance of each disc member 13 with the transmittance of the diffuser plate 2, which prevents luminance on the diffuser plate 2 from lacking in uniformity. In this case, it is desirable to apply optical coupling agent such as silicone grease on boundaries between the diffuser plate 2 and the disc members 13, between the disc members 13 and the engagement portions 9b and between the engagement portions 9b and the diffuser plate 2 to keep optical continuous state on the diffuser plate 2, the disc members 13 and the engagement portions 9b. It is also desirable to form the fixing members 1b as transparent members such that the fixing members 1b do not affect light entering the diffuser plate 2 from the CCFLs 3 and the reflector member 5. Therefore, it is not necessary to manufacture each fixing member 1b by two-color injection molding, which reduces a manufacturing cost of each fixing member 1b.

Figure 6:
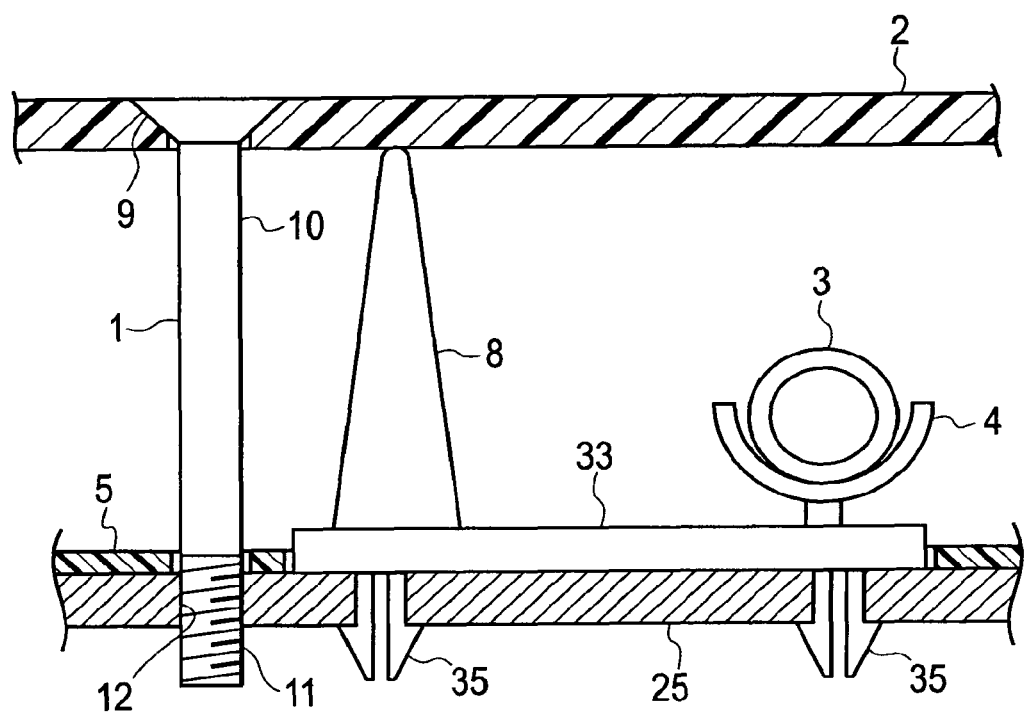
FIG. 6 is a cross-sectional diagram illustrating a modified installation of a spacer and a lamp holder in the liquid crystal display shown in FIG. 1.

Although the reflector member 5 and the housing 25 are sandwiched between the base plate portions 33 and the engagement portions 35 mounted on the base plate portions 33 to integrally mount the lamp holders 4 and the spacers 8 thereon, either the reflector member 5 and the housing 25 may be sandwiched between the base plate portions 33 and the engagement portions 35 to integrally mount the lamp holders 4 and spacers 8 thereon. For example, as shown in FIG. 6, only the housing 25 may be sandwiched between each base plate portion 33 and each engagement portion 35 under a situation where a through hole of which a size is larger than one of each base plate portion 33 is formed on the reflector member 5.

In order to prevent luminance in the liquid crystal display 21 from lacking in uniformity, it is effective to match an amount of light per unit area passing through each engagement portion 9 shown in FIG. 1, each engagement portion 9b shown in FIG. 4 or each disc member 13 shown in FIG. 5, to an amount of light per unit area passing through the diffuser plate 2. Due to this, it is necessary that transmittance of each disc member 13 shown in FIG. 5 is lower than one of the diffuser plate 2 because each engagement portion 9b is made of transparent member. This allows an amount of light per unit area passing through each disc member 13 to be matched to an amount of light per unit area passing through the diffuser plate 2.

Each fixing member 1 (or 1b) shown in FIG. 3 (or 4) may be made of a transparent member under a situation where an end surface 39 of each engagement portion 9 (or 9b) is colored or covered with material such as semi-transparent material of which transmittance is adequately adjusted. This configuration can obtain the same effect as that obtained by making each engagement portion 9 (9b) with semi-transparent material.

The backlight device 23 is a backlight device in which one or more light sources are arranged in a housing and a diffuser plate is arranged in front of the one or more light sources, and which has deflection prevention means for preventing the diffuser plate from bending in front and substantially equalizing luminance distribution on the diffuser plate by adjusting transmittance of a part thereof.

It is noted that although the backlight device 23 is employed in the liquid crystal display 21 in this described configuration, the backlight device 23 may be employed in another apparatus.

(Second Described Configuration)

A liquid crystal display 101 includes a liquid crystal panel 102 and a backlight device 103. The liquid crystal panel 102 is arranged as a display unit in the front of the liquid crystal display 101 (a viewed side, a display surface side, or a front side of the liquid crystal display 101). The backlight device 103 illuminates the liquid crystal panel 102. It is noted that the upper side of FIG. 7 corresponds to the front side of the liquid crystal display 101 and the lower side of FIG. 7 corresponds to a rear side of the liquid crystal display 101.

The backlight device 103 includes optical sheets 104, supporting members 105, a housing (open case) 1031, a diffuser plate 1032, a reflector sheet (reflector member) 1033, CCFLs 1034 and lamp holders 1035.

The housing 1031 has one open surface. The diffuser plate 1032 is a light diffuser plate for diffusing light emitted from the CCFLs 1034 and arranged on the one open surface to close the housing 1031. The diffuser plate 1032 is supported by the supporting members 105. The housing 1031 accommodates the supporting members 105, the reflector member 1033, the CCFLs 1034 and the lamp holders 1035. Each supporting member 105 has one end portion engaged to each recessed portion 1065 of the diffuser plate 1032 and the other end portion engaged to the housing 1031. The reflector member 1033 is called a reflector. The CCFLs 1034 are light sources. In the backlight device 103, the CCFLs 1034 are arranged at a back surface side of the diffuser plate 1032 (below the diffuser plate 1032 in FIG. 7) and light emitted from the CCFLs 1034 passes through the diffuser plate 1032 to be emitted from a front surface (emitting surface) of the diffuser plate 1032 (the upper surface of the diffuser plate 1032 in FIG. 7).

Each optical sheet 104 is composed of a polarization split film 1041, a diffusion film 1042, a prism film 1043 or the like for improving a view angle, and arranged between the liquid crystal panel 102 and the backlight device 103. It is noted that although the optical sheets 104 is formed by plural sheets (e.g., three sheets) in practice, FIG. 7 illustrates one optical sheet 104 formed by one sheet.

Figure 7:
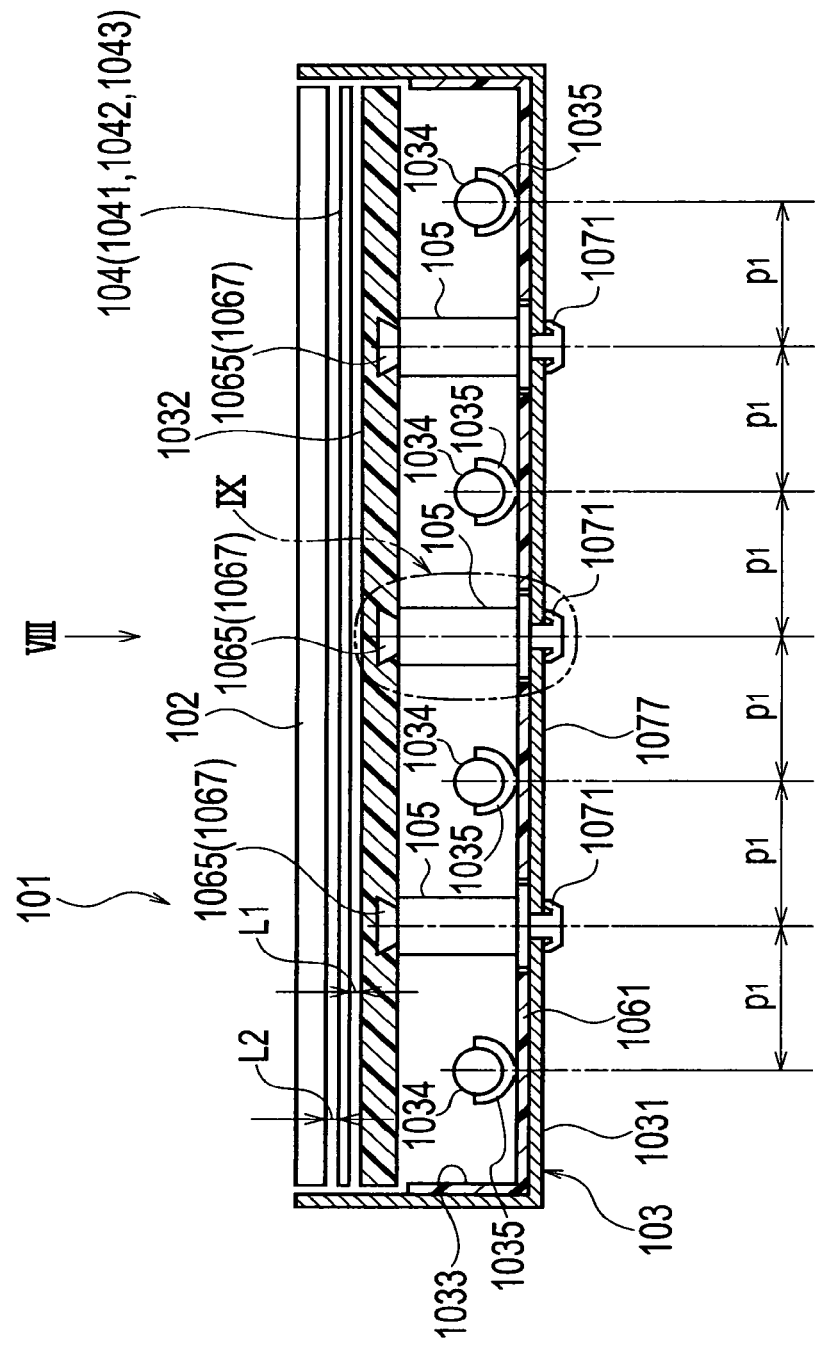
FIG. 7 is a schematic cross-sectional diagram of a liquid crystal display according to a second described configuration of the present disclosure.
Figure 8:
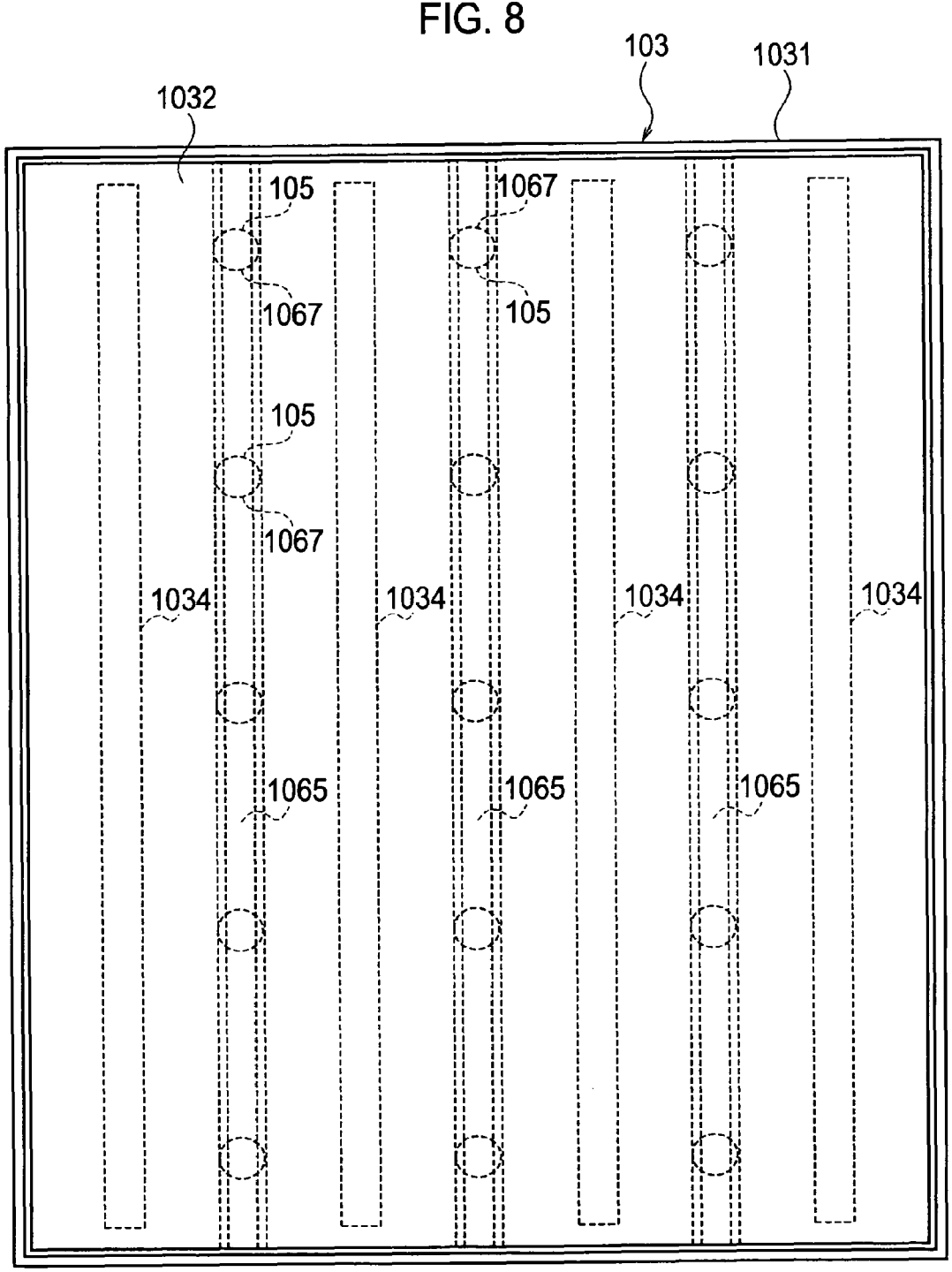
FIG. 8 is a diagram viewed from a direction of arrow VIII shown in FIG. 7.

Although FIG. 7 illustrates the liquid crystal display 101 in which there are an interval L1 between the optical sheets 104 and the diffuser plate 1032 and an interval L2 between the optical sheets 104 and the liquid crystal panel 102, the liquid crystal panel 102, the optical sheets 104 and the diffuser plate 1032 are integrally mounted on an edge of rectangular open portion of the housing 1031 using a rectangular framing chassis in practice. At this time, a value of the interval L1 is about "0" and a value of the interval L2 is slightly more than "0".

The reflector member 1033 is mainly arranged in a rear side of the CCFLs 1034 and reflects light emitted from the CCFLs 1034 toward the front of the liquid crystal display 101 (the upper side of FIG. 7). The diffuser plate 1032 is formed in a tabular shape and is a predetermined distance away from the CCFLs 1034 and arranged in parallel to the CCFLs 1034 in front of the CCFLs 1034. The diffuser plate 1032 is arranged to a position opposed to a bottom plate 1061 of the reflector member 1033 with respect to the CCFLs 1034.

Although this described configuration illustrates a case where line light sources such as the CCFLs 1034 each of which is arranged to be a predetermined distance away from and parallel to an adjacent CCFL 1034 (that is, on the same plane) is employed as light sources, point light sources such as LEDs may be employed. In a case where the point light sources are employed as light sources, each LED is arranged to be a predetermined distance away from an adjacent LED on the same plane.

As a concrete example, the diffuser plate 1032 is about 2 mm thick and made of a milky-white rectangular synthetic resin. Each CCFL 1034 has a diameter of about 3 mm and is formed in a cylindrical shape. Each CCFL 1034 is arranged in a longitudinal direction of the rectangular housing 1031 (reflector member 1033) to be a predetermined distance (about 23 mm, distance "P1*2" shown in FIG. 7) away from an adjacent CCFL 1034. In a case where the liquid crystal display 101 has 42-inch size, 22 CCFLs 1034 are included in the liquid crystal display 101. A distance between the diffuser plate 1032 and the bottom plate 1061 of the reflector member 1033 is 9 mm.

Both surfaces of the diffuser plate 1032 in a thickness direction thereof are parallel to the CCFLs 1034. The diffuser plate 1032 is away from the CCFLs 1034 in the thickness direction of the diffuser plate 1032.

Figure 19:
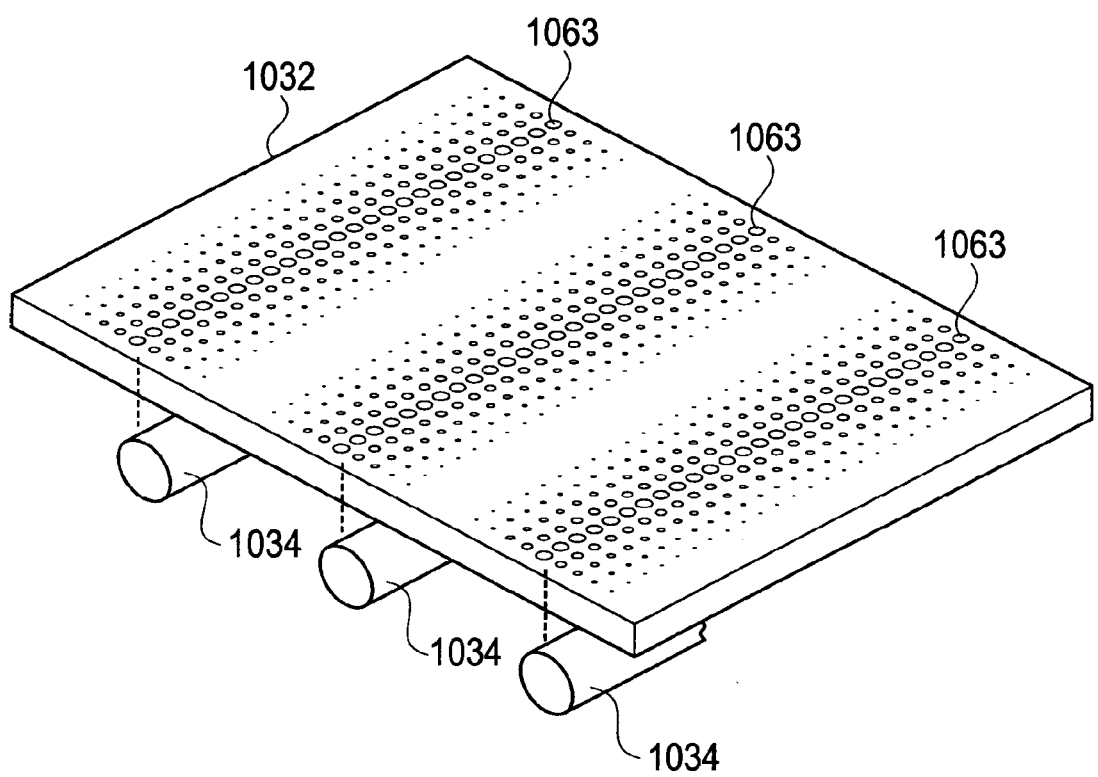
FIG. 19 is a perspective view illustrating a positional relation of dot geometries on the diffuser plate and CCFLs shown in FIG. 7.

As shown in FIG. 19, a plurality of dot geometries 1063 for adjusting an intensity of light emitted from the CCFLs 1034 may be formed on the back surface of the diffuser plate 1032 (the lower surface of the diffuser plate 1032 in FIG. 7). It is noted that FIG. 19 illustrates the dot geometries 1063 on the front surface of the diffuser plate 1032, for convenience sake.

For example, the dot geometries 1063 on the diffuser plate 1032 are the same as dot geometries disclosed in Japanese Published Unexamined Application No. 2005-117023. The dot geometries 1063 adjust an intensity of light emitted from light sources such as line light sources (e.g., CCFLs 1034) or point light sources (e.g., LEDs), which keeps uniformity of luminance on the diffuser plate 1032. It is noted that instead of the dot geometries 1063, another parts may be employed to adjust an intensity of light emitted from light sources.

For example, the dot geometries 1063 are formed on the diffuser plate 1032 by printing a plurality of dots on the diffuser plate 1032 using white ink having high reflectance. The number of dots or the diameter of dot in a region near to each CCFL 1034 is larger than that in a region far from each CCFL 1034. The number of dots or the diameter of dot gradually decreases with the increasing distance from each CCFL 1034. This optimally adjusts transmittance of the diffuser plate 1032 for light emitted from the CCFLs 1034.

The housing 1031 is made of metal and formed in a rectangular box shape. The reflector member 1033 is made of resin and formed in a rectangular box shape. The reflector member 1033 has an inner surface on which a reflector portion is formed, and an outer surface which contacts with an inner surface of the housing 1031 or is opposed to the inner surface of the housing 1031 at slight interval when the reflector member 1033 is mounted to the housing 1031. Rectangular open portion sides of the housing 1031 and the reflector member 1033 correspond to the front side of the backlight device 103 (the liquid crystal display 101). A bottom side of the housing 1031 and the rectangular flat bottom plate 1061 side of the reflector member 1033 correspond to the rear side of the backlight device 103 (the liquid crystal display 101).

Each CCFL 1034 is integrally mounted to the housing 1031 and the reflector member 1033 via each lamp holder 1035, in the vicinity of a flat bottom portion of the inner surface of the reflector member 1033. The longitudinal direction of each CCFL 1034 corresponds to the longitudinal directions of the housing 1031 and the reflector member 1033. It is noted that the longitudinal direction of each CCFL 1034 may correspond to width directions of the housing 1031 and the reflector member 1033. Each CCFL 1034 extends so as to be parallel to an adjacent CCFL 1034 at a predetermined interval (P1*2). A distance between one CCFL 1034 and the flat bottom portion of the inner surface of the reflector member 1033 is equal to one between another CCFL 1034 and the flat bottom portion of the inner surface of the reflector member 1033.

Since the emitting surface of the diffuser plate 1032 has a large area, the supporting members 105 support the diffuser plate 1032 to prevent the diffuser plate 1032 from bending.

Recessed portions 1065 are formed on the back surface of the diffuser plate 1032. The supporting members 105 are engaged to the recessed portions 1065 to support the diffuser plate 1032. Each recessed portion 1065 does not penetrate the diffuser plate 1032. For example, each recessed portion 1065 is a circular recess or a groove-like recess. The supporting members 105 are independent of the diffuser plate 1032 and are detachably engaged to the diffuser plate 1032 via the recessed portions 1065.

The supporting members 105 support the diffuser plate 1032 to install the diffuser plate 1032 in the housing 1031. Each supporting member 105 is formed in a columnar shape and has one end portion engaged to each recessed portion 1065 to support the diffuser plate 1032, and the other end portion engaged to the housing 1031 and the reflector member 1033 to integrally install the diffuser plate 1032 in the housing 1031, in a longitudinal direction thereof.

As will be described later (see an engagement portion 1067 indicated in a dashed line in FIG. 18A or 18C), each supporting member 105 may be firmly engaged to each recessed portion 1065 in a thickness direction of the diffuser plate 1032 and loosely engaged to each recessed portion 1065 in a direction (in-plane direction) perpendicular to the thickness direction of the diffuser plate 1032. Under this configuration, the diffuser plate 1032 is incapable of moving with respect to the housing 1031 in the thickness direction and capable of slightly moving with respect to the housing 1031 in the in-plane direction.

As will be described later, a part of each supporting member 105 (e.g., a region of diffuser plate 1032 side) is made of transparent material (light transmissive member) such as transparent resin. Only a region of each supporting member 105 other than a portion to be engaged to the diffuser plate 1032 and a portion to be engaged to the housing 1031 may be made of light transmissive member. Optical coupling agent, which is an optical characteristic conditioner having the same optical characteristic as the diffuser plate 1032 and each supporting member 105, is filled in a clearance between a recessed portion 1065 of the diffuser plate 1032 and an engagement portion 1067 of each supporting member 105. When the diffuser plate 1032 is integrally mounted to each supporting member 105, the optical coupling agent also has a function of adhesive agent. As the optical coupling agent, silicone grease or adhesive agent with light transparency is cited.

For a cross-sectional area of each recessed portion 1065 due to a plane (see a horizontal direction of FIGS. 7 and 9, a plane extending in a direction perpendicular to a plane of paper in FIG. 7, and a plane extending in a direction parallel to a plane of paper in FIG. 8) perpendicular to the thickness direction of the diffuser plate 1032, a cross-sectional area of portion adjacent to the front surface of the diffuser plate 1032 is larger than one adjacent to the back surface of the diffuser plate 1032. As viewed from the thickness direction of the diffuser plate 1032, the cross-sectional surface of portion adjacent to the back surface of the diffuser plate 1032 exits inside the cross-sectional surface of portion adjacent to the front surface of the diffuser plate 1032.

An engagement portion 1067 of each supporting member 105 is formed in a shape similar to an associated recessed portion 1065 and fitted into the associated recessed portion 1065. The diffuser plate 1032 is held and supported in at least the thickness direction of the diffuser plate 1032 by the supporting members 105 because the engagement portions 1067 of the supporting members 105 are engaged to associated recessed portions 1065.

Figure 9:
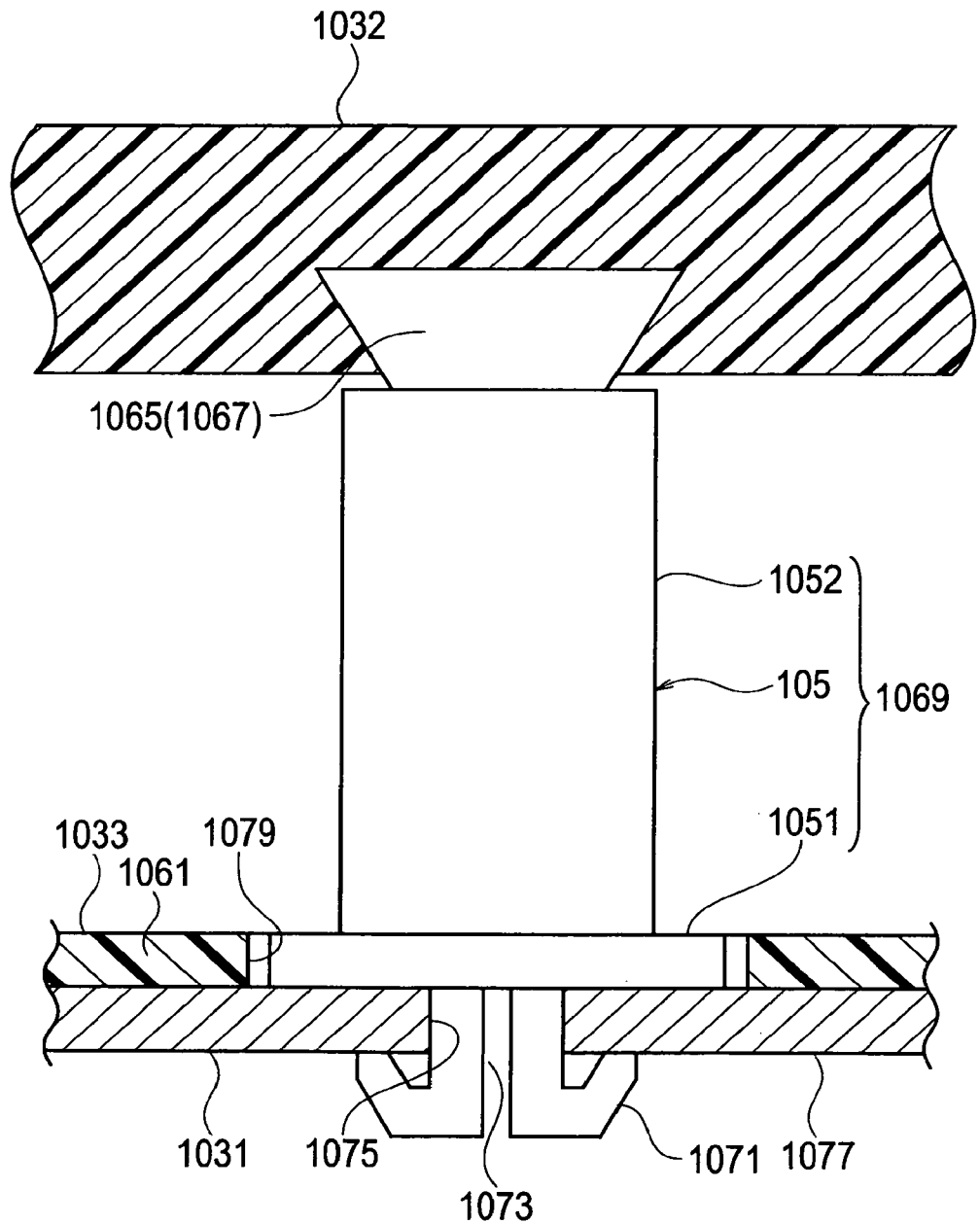
FIG. 9 is an enlarged cross-sectional diagram of a part IX shown in FIG. 7.

More specifically, each recessed portion 1065 is formed in a linear croze shape (a groove geometry with a trapezoidal cross section), such that a width of cross-sectional surface due to a plane perpendicular to a longitudinal direction of the recessed portion 1065 is the narrowest in a region where light emitted from the CCFLs 1034 starts to enter the diffuser plate 1032, and a cross-sectional surface of the croze due to a plane perpendicular to a longitudinal direction of the croze is formed in a isosceles trapezoid shape (see FIGS. 7 and 9). Thus, a width of croze adjacent to the back surface of the diffuser plate 1032 is shorter than one adjacent to the front surface of the diffuser plate 1032. As described the above, for a cross sectional area of each recessed portion 1065 due to a plane perpendicular to the thickness direction of the diffuser plate 1032, a cross-sectional area of portion adjacent to the back surface of the diffuser plate 1032 is relatively small and a cross-sectional area of portion adjacent to the front surface of the diffuser plate 1032 is relatively large. The cross-sectional surface of portion adjacent to the back surface of the diffuser plate 1032 exits inside the cross-sectional surface of portion adjacent to the front surface of the diffuser plate 1032.

The diffuser plate 1032 is formed by injection molding. The recessed portions 1065 are formed at the time of the injection molding. Each recessed portion 1065 is formed in a croze shape. Since a cross-section surface of the corze due to a plane perpendicular to a longitudinal direction of the croze has a constant form, an undercut portion is not formed at the time of the injection molding, which simplifies a structure of mold to be used in the time of the injection molding of the diffuser plate 1032.

An engagement portion 1067 of each columnar supporting member 105 is formed in a circular truncated cone shape. The engagement portion 1067 has an upper surface whose area is relatively small located at a side of a cylindrical or prismatic linking portion (main body portion) 1069 of the supporting member 105, and a bottom surface whose area is relatively large located at a side (one end portion of the supporting member 105) opposed to the main body portion 1069. For example, the bottom surface of the engagement portion 1067 has an area smaller than one of a cross-sectional surface of the main body portion 1069 due to a plane perpendicular to a height direction of the supporting member 105. In this case, the supporting member 105 has a constricted portion in a boundary region (at a side of the one end portion of the supporting member 105 in the height direction of the supporting member 105) between the engagement portion 1067 and the main body portion 1069.

In a situation where the supporting members 105 are mounted to the diffuser plate 1032 by engaging the engagement portions 1067 of the supporting members 105 to the recessed portions 1065 of the diffuser plate 1032, as shown in FIG. 9, a bottom surface of each recessed portion 1065 (a bottom surface of circular truncated cone) contacts with a bottom surface of each engagement portion 1067 (a distal end surface of the supporting member 105), and a slant surface of each recessed portion 1065 (a slant surface of circular truncated cone) contacts with a slant surface of each engagement portion 1067. More specifically, the bottom surface of each recessed portion 1065 is opposed to the bottom surface of each engagement portion 1067 via a very thin film of optical coupling agent, and the slant surface of each recessed portion 1065 is opposed to the slant surface of each engagement portion 1067 via a very thin film of optical coupling agent. Under this configuration, the diffuser plate 1032 is held in at least the thickness direction of the diffuser plate 1032 by the supporting members 105.

Figure 10:
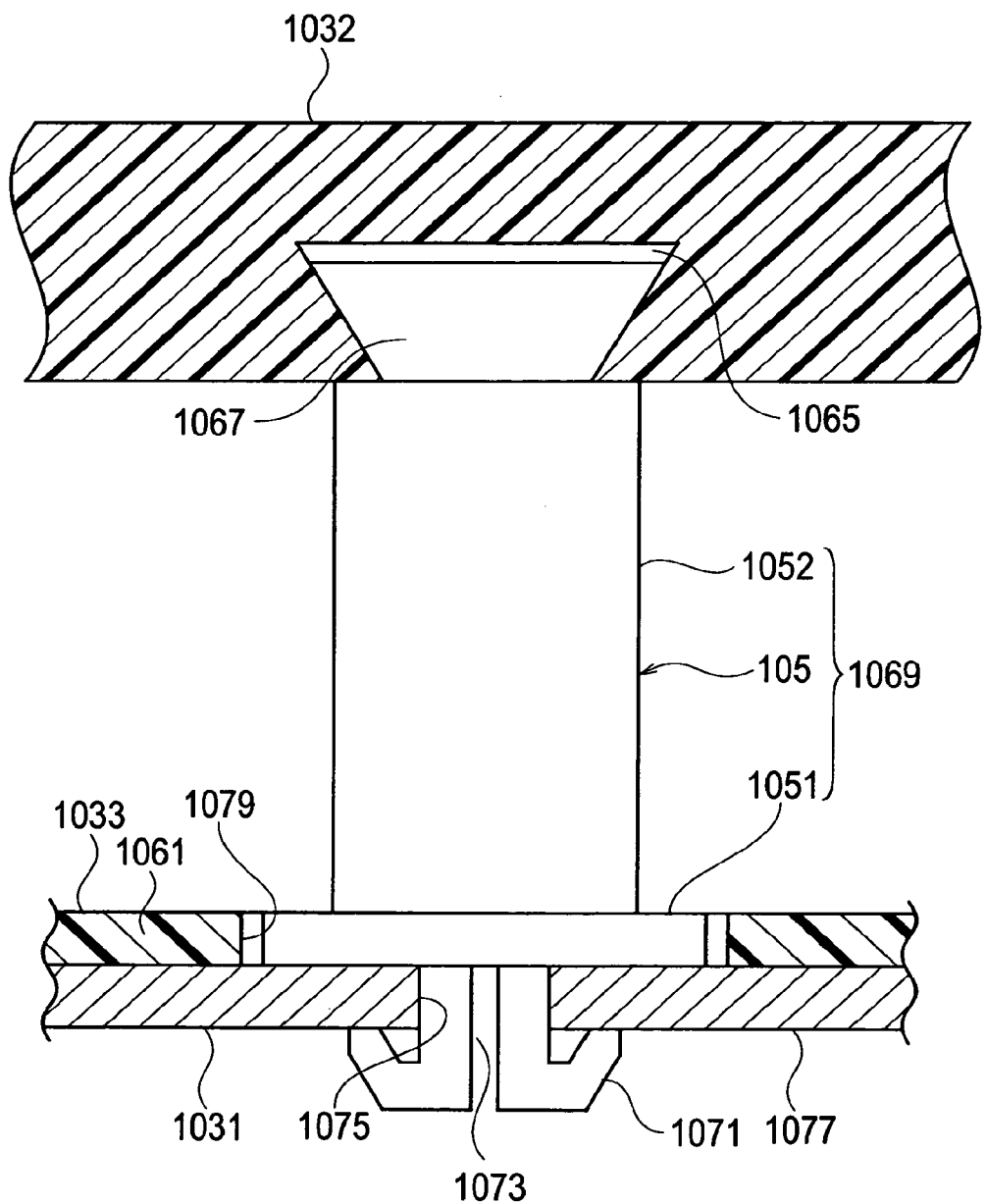
FIG. 10 is a cross-sectional diagram illustrating a modified engagement state of a supporting member and a diffuser plate shown in FIG. 9.

In a situation where the supporting members 105 are mounted to the diffuser plate 1032 by engaging the engagement portions 1067 of the supporting members 105 to the recessed portions 1065 of the diffuser plate 1032, as shown in FIG. 10, the following configuration may be employed: the back surface of the diffuser plate 1032 contacts with an end surface of a main body portion 1069 of each supporting member 105 (end surface at a side of an engagement portion 1067) and a slant surface of each recessed portion 1065 (a slant surface of circular truncated cone) contacts with a slant surface of each engagement portion 1067. Under this configuration, the diffuser plate 1032 is held in at least the thickness direction of the diffuser plate 1032 by the supporting members 105.

The engagement portions 1067 may be formed in a pyramid shape (e.g., four-sided pyramid). In this case, the main bodies 1069 may be formed in a columnar or prismatic shape.

Next, a method for mounting the supporting members 105 to the housing 1031 will be described.

Each supporting member 105 is formed in a columnar shape and includes a fixing portion (engagement portion) 1071, a main body portion 1069 and an engagement portion 1067 in this order in the height direction thereof extending from a base end portion side to a distal end portion side thereof. Axes of the engagement portion 1071, the main body portion 1069 and the engagement portion 1067 are coincident with one another.

Each engagement portion 1071 is formed in an umbrella shape and has a notch 1073 which extends along an axial direction in a center region thereof (see FIG. 9). Each engagement portion 1071 has elasticity in a radial direction thereof.

Each supporting member 105 is integrally mounted to the housing 1031 by engaging the engagement portion 1071 thereof to the housing 1031. More specifically, the engagement portion 1071 is inserted into a through hole 1075 formed in a bottom plate 1077 of the housing 1031. At this time, the engagement portion 1071 is fitted in the through hole 1075 and the housing 31 is sandwiched between a distal end of the engagement portion 1071 and the main body portion 1069. Under this configuration, each supporting member 105 is integrally mounted to the housing 1031 such that it stands on an inner bottom portion of the housing 1031. Each supporting member 105 is integrally mounted to only the housing 1031 because a through hole 1079, which has an inner diameter larger than a diameter of the main body portion 1069, is formed on the reflector member 1033.

Figure 11:
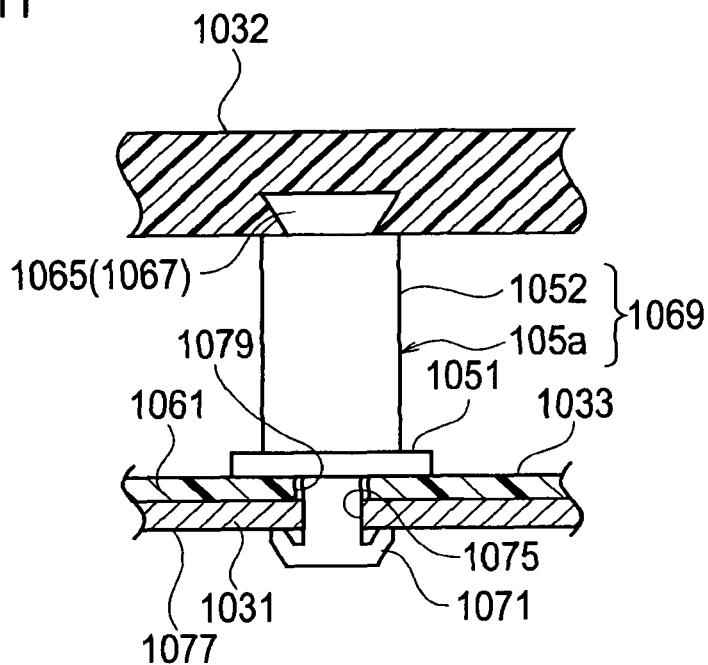
FIG. 11 is a cross-sectional diagram illustrating a modified engagement state of the supporting member and a housing shown in FIG. 9.

As shown in FIG. 11, each supporting member 105a may be integrally mounted to the housing 1031 and the reflector member 1033 such that it stands on an inner bottom portion of the reflector member 1033, by sandwiching the housing 1031 and the reflector member 1033 between the distal end of the engagement portion 1071 and the main body portion 1069 thereof.

Figure 12:
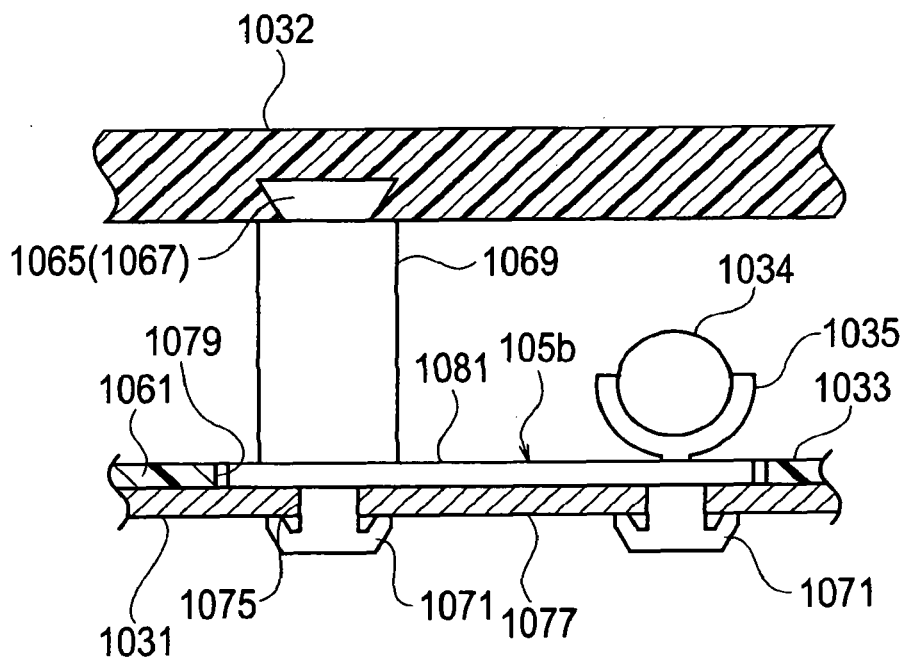
FIG. 12 is a cross-sectional diagram of a supporting member that doubles as a lamp holder for fixing a CCFL shown in FIG. 7.

As shown in FIG. 12, each supporting member 105b may double as each lamp holder 1035. It is desirable because man-hour and cost for each lamp holder 1035 are reduced.

In this case, each supporting member 105b includes a light source holder (lamp holder) 1035 and a linking portion 1081 in addition to an engagement portion 1067, a main body portion 1069 and an engagement portion 1071. The lamp holder 1035 holds a CCFL 1034. The linking portion 1081 links the lamp holder 1035 with the main body portion 1069. For example, the lamp holder 1035, the main body portion 1069 and the linking portion 1081 are formed by integral molding such as mold forming. In a situation where each supporting member 105*b* is mounted to the housing 1031 and the CCFL 1034 is mounted to the lamp holder 1035, the linking portion 1081 is located in a back side of the CCFL 1034.

The linking portion 1081 is formed in a rectangular thin plate-like shape, and has one surface in a thickness direction thereof on which the main body portion 1069 and the lamp holder 1035 are mounted and has the other surface in the thickness direction thereof on which two engagement portions 1071 are mounted. Each supporting member 105*b* is integrally mounted to the housing 1031 by these engagement portions 1071.

The shape of each recessed portion 1065 may be appropriately modified.

Figure 18A:
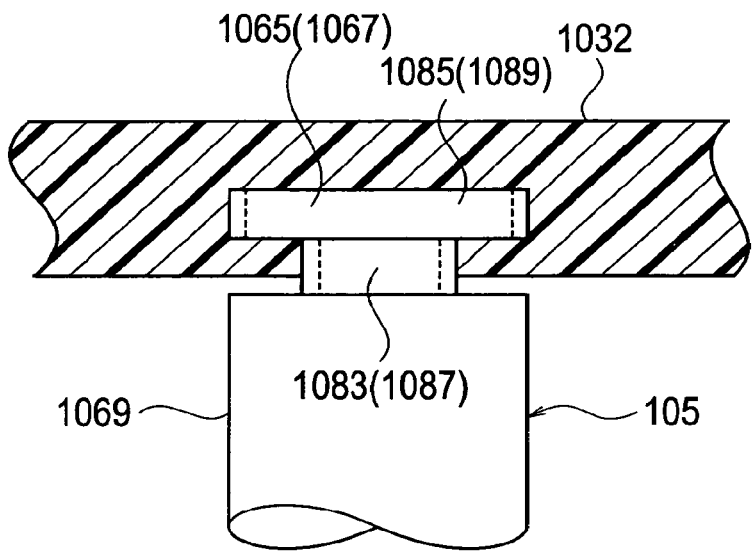
FIGS. 18A to 18C are diagrams each illustrating a modification of a recessed portion of the diffuser plate and an engagement portion of the supporting member shown in FIG. 7.

As shown in FIG. 18A, a cross-sectional shape of each recessed portion 1065 due to a plane perpendicular to a longitudinal direction of the recessed portion 1065 may be a T-letter shape. The recessed portion 1065 having the T-letter shape in cross-sectional surface includes a first rectangular part 1083 and a second rectangular part 1085. The first rectangular part 1083 is located at the back surface side of the diffuser plate 1032. The second rectangular part 1085 is located at the front surface side of the diffuser plate 1032. The first rectangular part 1083 and the second rectangular part 1085 are concentrically formed in a width direction thereof (a horizontal direction in FIG. 18A), and a width of the second rectangular part 1085 is larger than one of the first rectangular part 1083.

An engagement portion 1067 of each supporting member 105 is formed in a shape to which the first rectangular part 1083 and the second rectangular part 1085 are fitted. More specifically, the engagement portion 1067 includes a first columnar (or prismatic) part 1087, which has a diameter (or width) substantially matching the width of the first rectangular part 1083, and a second columnar (or prismatic) part 1089, which has a diameter (or width) substantially matching the width of the second rectangular part 1085.

It is noted that as indicated a dashed line in FIG. 18A, the diameter (or width) of the first part 1087 may be smaller than the width of the first rectangular part 1083, and the diameter (or width) of the second part 1089 may be smaller than the width of the second rectangular part 1085. Under this configuration, the supporting members 105 support the diffuser plate 1032 such that the diffuser plate 1032 is incapable of moving with respect to the housing 1031 in the thickness direction (a vertical direction in FIG. 18A) and capable of slightly moving with respect to the housing 1031 in the in-plane direction (the horizontal direction in FIG. 18A).

Figure 18B:
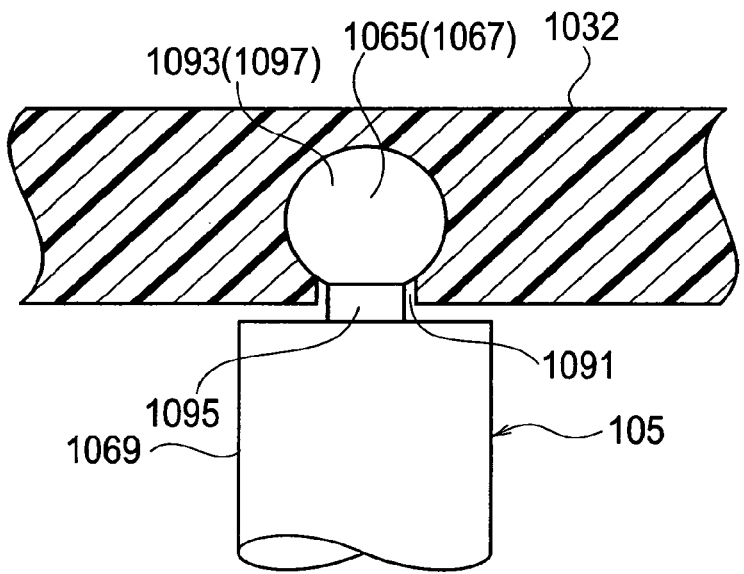

As shown in FIG. 18B, a cross-sectional shape of the recessed portion 1065 due to the plane perpendicular to a longitudinal direction of the recessed portion 1065 may be a keyhole-like shape. The recessed portion 1065 having the keyhole-like shape in cross-sectional surface includes a rectangular part 1091 and a circular part 1093. The rectangular part 1091 is located at the back surface side of the diffuser plate 1032. The circular part 1093 is located at the front surface side of the diffuser plate 1032. The rectangular part 1091 and the circular part 1093 are concentrically formed in a width direction thereof, and a diameter of the circular part 1093 is larger than a width of the rectangular part 1091.

An engagement portion 1067 of each supporting member 105 is formed in a shape to which the rectangular part 1091 and the circular part 1093 are fitted. More specifically, the engagement portion 1067 includes a columnar (or prismatic) part 1095, which has a diameter (or width) smaller than a width of the rectangular part 1091, and a spherical (or columnar) part 1097, which has a diameter substantially matching the diameter of the circular part 1093.

Figure 18C:
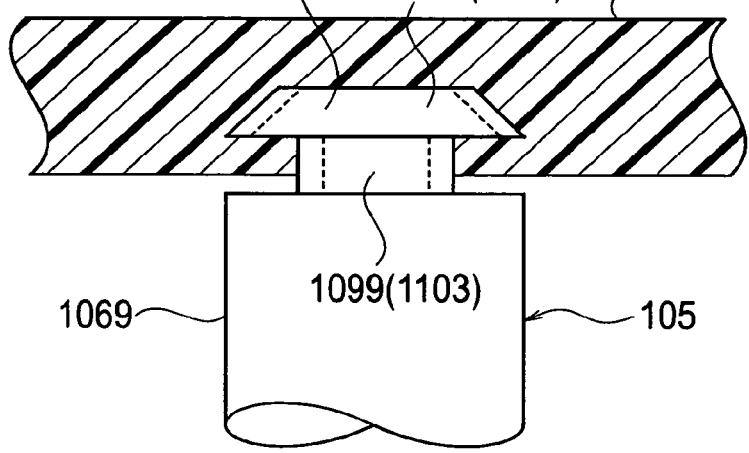

As shown in FIG. 18C, a cross-sectional shape of the recessed portion 1065 due to the plane perpendicular to a longitudinal direction of the recessed portion 1065 may be a substantial T-letter shape having an isosceles trapezoid part. The recessed portion 1065 having the substantial T-letter shape in cross-sectional surface includes a rectangular part 1099 and an isosceles trapezoid part 1101. The rectangular part 1099 is located at the back surface side of the diffuser plate 1032. The isosceles trapezoid part 1101 is located at the front surface side of the diffuser plate 1032. The isosceles trapezoid part 1101 includes an upper base, which is located at the front surface side of the diffuser plate 1032, and a lower base, which is longer than the upper base and located at the back surface side of the diffuser plate 1032. A width of the rectangular part 1099 is shorter than the lower base of the isosceles trapezoid part 1101. The rectangular part 1099 and the isosceles trapezoid part 1101 are concentrically formed in a width direction thereof.

An engagement portion 1067 of each supporting member 105 is formed in a shape to which the rectangular part 1099 and the isosceles trapezoid part 1101 are fitted. More specifically, the engagement portion 1067 includes a first columnar (or prismatic) part 1103, which has a diameter (or width) substantially matching the width of the rectangular part 1099 and a second truncated-cone-like (or truncated-pyramid-like) part 1105, which has a small diameter (or small width) substantially matching a length of the upper base of the isosceles trapezoid part 1101 and a large diameter (or large width) substantially matching a length of the lower base of the isosceles trapezoid part 1101.

It is noted that as indicated a dashed line in FIG. 18C, the diameter (or width) of the first part 1103 may be smaller than the width of the rectangular part 1099, and the diameter (or width) of the second part 1105 may be smaller than the width of the isosceles trapezoid part 1101. Under this configuration, the supporting members 105 support the diffuser plate 1032 such that the diffuser plate 1032 is incapable of moving with respect to the housing 1031 in the thickness direction (a vertical direction in FIG. 18C) and capable of slightly moving with respect to the housing 1031 in the in-plane direction (the horizontal direction in FIG. 18C).

The recessed portion 1065 may be divided such that a plurality of recessed portions is discretely arranged on the back surface of the diffuser plate 1032 in a point-like manner, instead of a groove extending linearly.

Figure 14A:
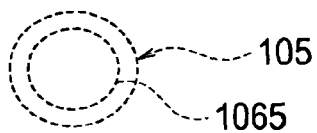
FIGS. 14A and 14B are diagrams illustrating a modification of a recessed portion of the diffuser plate and an engagement portion of the supporting member shown in FIG. 7.
Figure 14B:
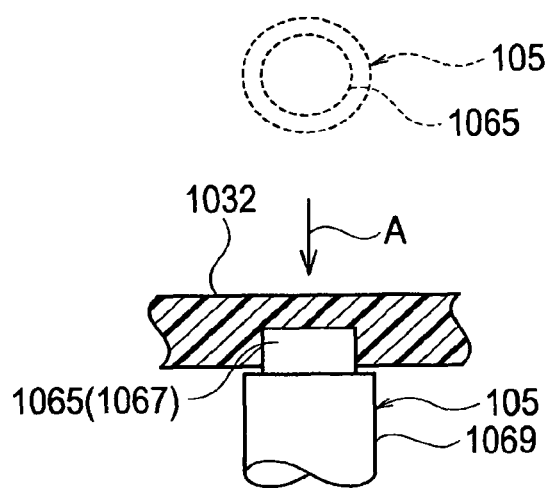

As shown in FIGS. 14A and 14B, the recessed portion 1065 is formed in a low columnar shape such that a height direction of the recessed portion 1065 is parallel to the thickness direction of the diffuser plate 1032. The engagement portion 1067 of each supporting member 105 is formed in a columnar shape which has a diameter substantially matching a diameter of the recessed portion 1065. The diffuser plate 1032 is supported by each supporting member 105 by inserting the engagement portion 1067 into the recessed portion 1065 and fitting the engagement portion 1067 to the recessed portion 1065. It is noted that FIG. 14A is drawn as viewed from an A arrow direction in FIG. 14B.

Figure 15A:
FIGS. 15A and 15B are diagrams illustrating a modification of a recessed portion of the diffuser plate and an engagement portion of the supporting member shown in FIG. 7.
Figure 15B:
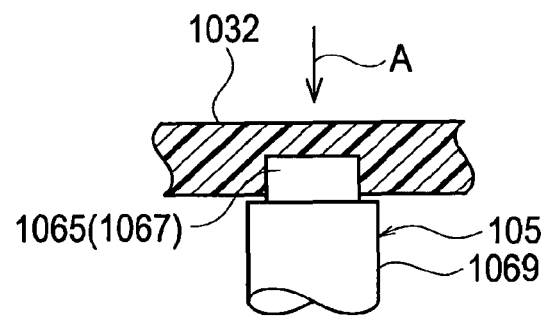

As shown in FIGS. 15A and 15B, the recessed portion 1065 is formed in a low elliptical columnar shape such that a height direction of the recessed portion 1065 is parallel to the thickness direction of the diffuser plate 1032. The engagement portion 1067 of each supporting member 105 is formed in an elliptical columnar shape which has an inner diameter substantially matching an inner diameter of the recessed portion 1065. The diffuser plate 1032 is supported by each supporting member 105 by inserting the engagement portion 1067 into the recessed portion 1065 and fitting the engagement portion 1067 to the recessed portion 1065. It is noted that FIG. 15A is drawn as viewed from an A arrow direction in FIG. 15B.

Figure 16A:
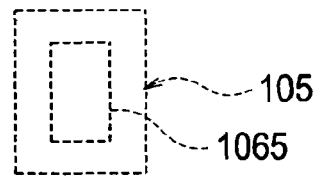
FIGS. 16A and 16B are diagrams illustrating a modification of a recessed portion of the diffuser plate and an engagement portion of the supporting member shown in FIG. 7.
Figure 16B:
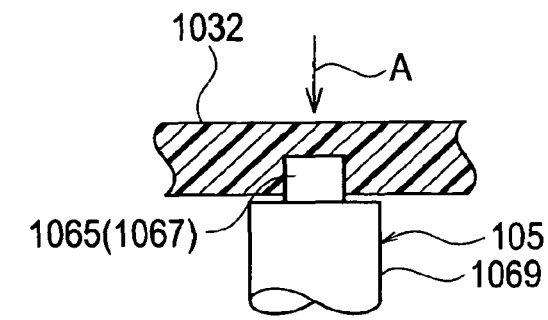

As shown in FIGS. 16A and 16B, the recessed portion 1065 is formed in a low quadratic prism shape such that a height direction of the recessed portion 1065 is parallel to the thickness direction of the diffuser plate 1032. The engagement portion 1067 of each supporting member 105 is formed in a quadratic prism shape which has an inner diameter substantially matching an inner diameter of the recessed portion 1065. The diffuser plate 1032 is supported by each supporting member 105 by inserting the engagement portion 1067 into the recessed portion 1065 and fitting the engagement portion 1067 to the recessed portion 1065. It is noted that FIG. 16A is drawn as viewed from an A arrow direction in FIG. 16B.

The engagement portion 1067 of each supporting member 105 may be engaged to the corresponding recessed portion 1065 of the diffuser plate 1032 using an adhesive agent or a double-faced tape 1107. It is preferable that the adhesive agent or the double-faced tape 1107 has a function as optical coupling agent.

Figure 17A:
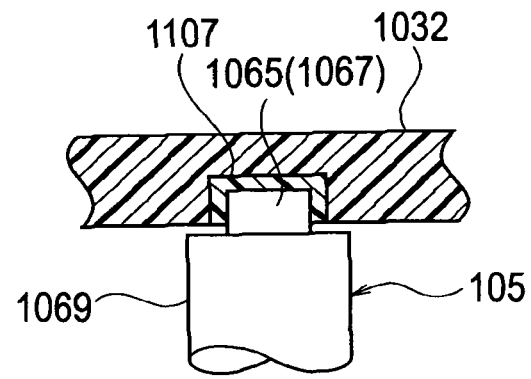
FIGS. 17A to 17C are diagrams each illustrating a state where an adhesive agent or a double-faced tape having a function as optical coupling agent is arranged between the recessed portion and the engagement portion shown in each of FIGS. 14A, 15A and 16A.
Figure 17B:
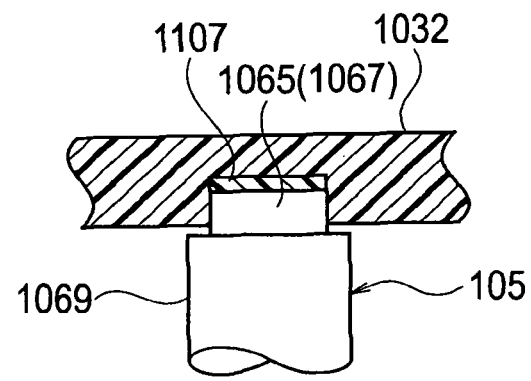
Figure 17C:
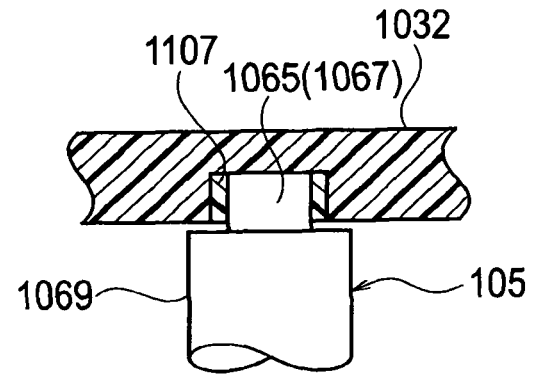

As shown in FIG. 17A, an adhesive agent or a double-faced tape 1107 may be arranged on a side surface and a bottom surface of the columnar engagement portion 1067. As shown in FIG. 17B, an adhesive agent or a double-faced tape 1107 may be arranged on only the bottom surface of the columnar engagement portion 1067. As shown in FIG. 17C, an adhesive agent or a double-faced tape 1107 may be arranged on only the side surface of the columnar engagement portion 1067.

The recessed portion 1065 may be divided such that a plurality of recessed portions, each of which is composed of an engaged part 1109 and an insertion part 1111 and has a predetermined length, is discretely arranged on the back surface of the diffuser plate 1032, instead of a groove extending linearly. The diffuser plate 1032 is integrally supported by each supporting member 105 by engaging the engagement portion 1067 of each supporting member 105 to the engaged part 1109. The insertion part 1111 is a part used for inserting the engagement portion 1067 into the recessed portion 1065 before the engagement portion 1067 is engaged to the engaged part 1109. An inner diameter of the insertion part 1111 is larger than an outer diameter of the engagement portion 1067. Under this configuration, the diffuser plate 1032 is integrally supported by the supporting members 105 by inserting the engagement portions 1067 of the supporting members 105 into insertion parts 1111 of the recessed portions 1065, and then horizontally moving the diffuser plate 1032 toward the supporting members 105 in one direction and engaging the engagement portions 1067 to engaged parts 1109 of the recessed portions 1065.

Figure 13A:
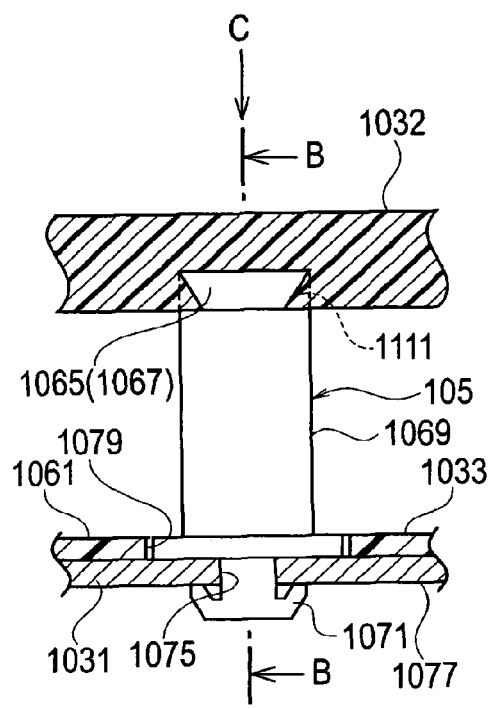
FIGS. 13A to 13D are diagrams illustrating a modification of a recessed portion of the diffuser plate and an engagement portion of the supporting member shown in FIG. 7.
Figure 13B:
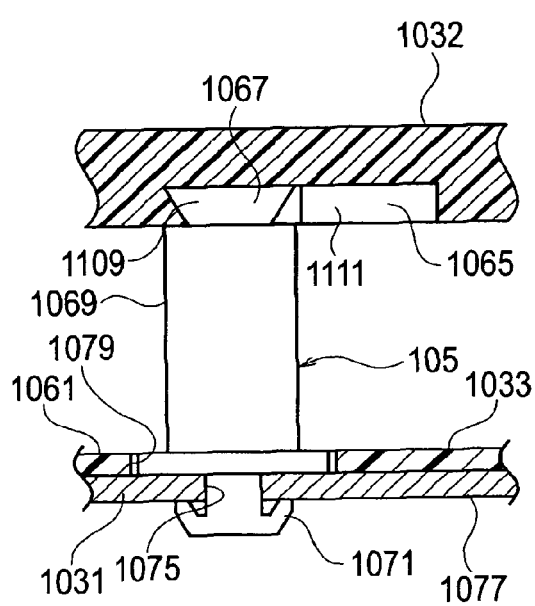
Figure 13C:
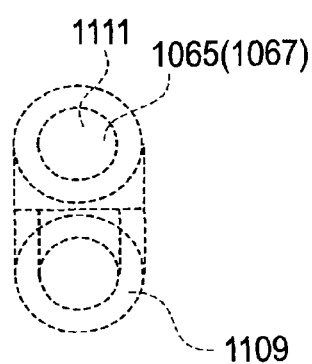
Figure 13D:
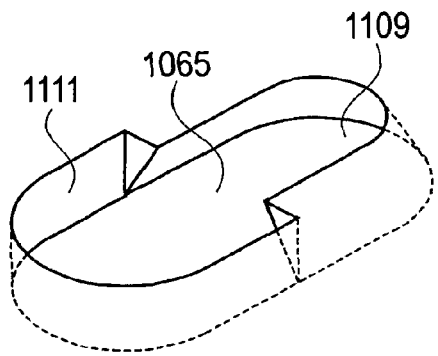

It is noted that FIG. 13A corresponds to FIG. 9, FIG. 13B is a cross-sectional diagram due to a line B-B in FIG. 13A, FIG. 13C is a diagram viewed from an arrow C in FIG. 13A, and FIG. 13D is a perspective diagram of each recessed portion 1065 composed of the engaged part 1109 and the insertion part 1111.

As shown in FIG. 9, each supporting member 105 includes the main body portion 1069. The main body portion 1069 has a base part 1051 located at a side of the reflector member 1033 and a supporting part 1052 located at a side of the engagement portion 1067. The base part 1051 and the engagement portion 1071 are made of white material having high optical reflectance such as white PC (polycarbonate resin). The supporting part 1052 and the engagement portion 1067 are made of transparent material. For example, each supporting member 105 is formed by injection-molding a transparent PC and a white PC at the same time or different time and assembling two parts. Each supporting member 105 may be formed by injection-molding a transparent PC and applying white ink to the base part 1051 and the engagement portion 1071.

From a result of experiment, it is found that if grooves (recessed portions 1065) each having a depth more than or equal to 1.3 mm are formed on the diffuser plate 1032 with pattern, this makes the diffuser plate 1032 difficult to keep strength thereof and reduces visibility, in a position where light blocking dots 1063 having the smallest diameter are formed (a position farthest away from the CCFL 1034). It is also found that even if the supporting member 1052 and the engagement portion 1067 are formed by transparent material, a region contacting on the diffuser plate 1032 with pattern has a width more than or equal to 10 mm, which reduces visibility (dispersion of luminance on the diffuser plate 1032 occurs).

Therefore, a diameter of the supporting part 1052 (a diameter of upper surface of the engagement portion 1067) is set to 5.0 mm, a height of the supporting part 1052 is set to 7 mm, a thickness of the base part 1051 is set to 1.0 mm, and a diameter of the base part 1051 is set to 7 mm.

It is noted that the above-described sizes are not always optimally, because visibility is varied due to a shape of each dot geometry 1063 on the diffuser plate 1032 with pattern and a distance between the diffuser plate 1032 with pattern and each CCFL 1034, which varies optimal sizes according to the varied visibility.

According to the backlight device 103, the supporting members 105 for supporting the diffuser plate 1032 are engaged to the recessed portions 1065 formed on the back surface of the diffuser plate 1032. This prevents luminance on the diffuser plate 1032 from lacking in uniformity in engagement regions where the supporting members 105 are engaged to the recessed portions 1065 and in the vicinity of the engagement regions.

If the supporting members support the diffuser plate by inserting the supporting members into through holes penetrating the diffuser plate, there is a possibility that luminance on the diffuser plate lacks in uniformity in engagement regions where the supporting members are engaged to the diffuser plate and in the vicinity of the engagement regions. For example, there is a possibility that the engagement regions where the supporting members are engaged to the diffuser plate are darker than the other regions of the diffuser plate. On the other hand, in the present described configuration, the supporting members 105 support the diffuser plate 1032 by engaging the supporting members 105 to the recessed portions 1065 formed on the back surface of the diffuser plate 1032. It is noted that the recessed portions 1065 do not penetrate the diffuser plate 1032. This prevents luminance on the diffuser plate 1032 from lacking in uniformity in the engagement regions where the supporting members 105 are engaged to the recessed portions 1065 and in the vicinity of the engagement regions, because a part of light emitted from the CCFLs 1034 enters the diffuser plate 1032 from a part of the back surface of the diffuser plate 1032 where the recessed portions 1065 are not formed and then passes through a part of the front surface of the diffuser plate 1032 opposed to the recessed portions 1065 so as to prevent the engagement regions from darkening.

If each supporting member 105 is firmly engaged to each recessed portion 1065 in a thickness direction of the diffuser plate 1032 and loosely engaged to each recessed portion 1065 in a direction (in-plane direction) perpendicular to the thickness direction of the diffuser plate 1032, this prevents a distance between one CCFL 1034 and the diffuser plate 1032 from differing from one between another CCFL 1034 and the diffuser plate 1032 due to deflection of the diffuser plate 1032 or deformation of the diffuser plate 1032 by thermal expansion. Namely, the configuration prevents displacement of the diffuser plate 1032 with respect to the CCFLs 1034 at low cost and prevents luminance on the diffuser plate 1032 from lacking in uniformity.

According to the backlight device 103, each supporting member 105 (an engagement portion 1067 and a supporting part 1052 of a main body portion 1069) is made of transparent material, and optical coupling agent is filled in a clearance between each recessed portion 1065 of the diffuser plate 1032 and an engagement portion 1067 of each supporting member 105 to keep optical continuous state on the diffuser plate 1032 and each supporting member 105. This further prevents luminance on the diffuser plate 1032 from lacking in uniformity in engagement regions where the supporting members 105 are engaged to the recessed portions 1065 and in the vicinity of the engagement regions. As will be described later, reinforcing members 1113 also prevent luminance on the diffuser plate 1032 from lacking in uniformity.

According to the backlight device 103, each recessed portion 1065 of the diffuser plate 1032 is formed in the above-described shape such as a croze shape. Therefore, the supporting members 105 restrain the diffuser plate 1032 from moving in the thickness direction of the diffuser plate 1032 in a simple configuration. This prevents luminance on the diffuser plate 1032 from lacking in uniformity due to deflection of the diffuser plate 1032 in the thickness direction of the diffuser plate 1032. This further allows the supporting members 105 to be simply attached to or detached from the diffuser plate 1032 by sliding the supporting members 105 with respect to the diffuser plate 1032 when the backlight device 103 is taken apart in order to replace a CCFL 1034.

According to the backlight device 103, the diffuser plate 1032 is formed by injection molding and the recessed portions 1065 are formed at the time of the injection molding. This allows the diffuser plate 1032 provided with the recessed portions 1065 to be easily manufactured. This further allows smooth surfaces of the recessed portions 1065 to be easily manufactured, which prevents luminance on the diffuser plate 1032 from lacking in uniformity.

According to the backlight device 103, each supporting member 105 fixed to the housing (back frame) 1031 and the reflector member 1033 is made of transparent material and white material having high optical reflectance. This prevents light from leaking toward the housing 1031 without interrupting light entering the diffuser plate 1032. This further prevents the engagement regions of the diffuser plate 1032 engaged to the supporting members 105 from darkening due to decreasing an amount of light of the engagement regions of the diffuse plate 1032 engaged to the supporting members 105 in comparison with the vicinity of the engagement regions.

Instead of the supporting members 105 or in addition to the supporting members 105, reinforcing members 1113 for reinforcing the diffuser plate 1032 may be engaged to the recessed portions 1065 of the diffuser plate 1032. The engagement of the reinforcing members 1113 to the recessed portions 1065 of the diffuser plate 1032 is similar to that of the supporting members 105 to the recessed portions 1065 of the diffuser plate 1032.

Figure 20:
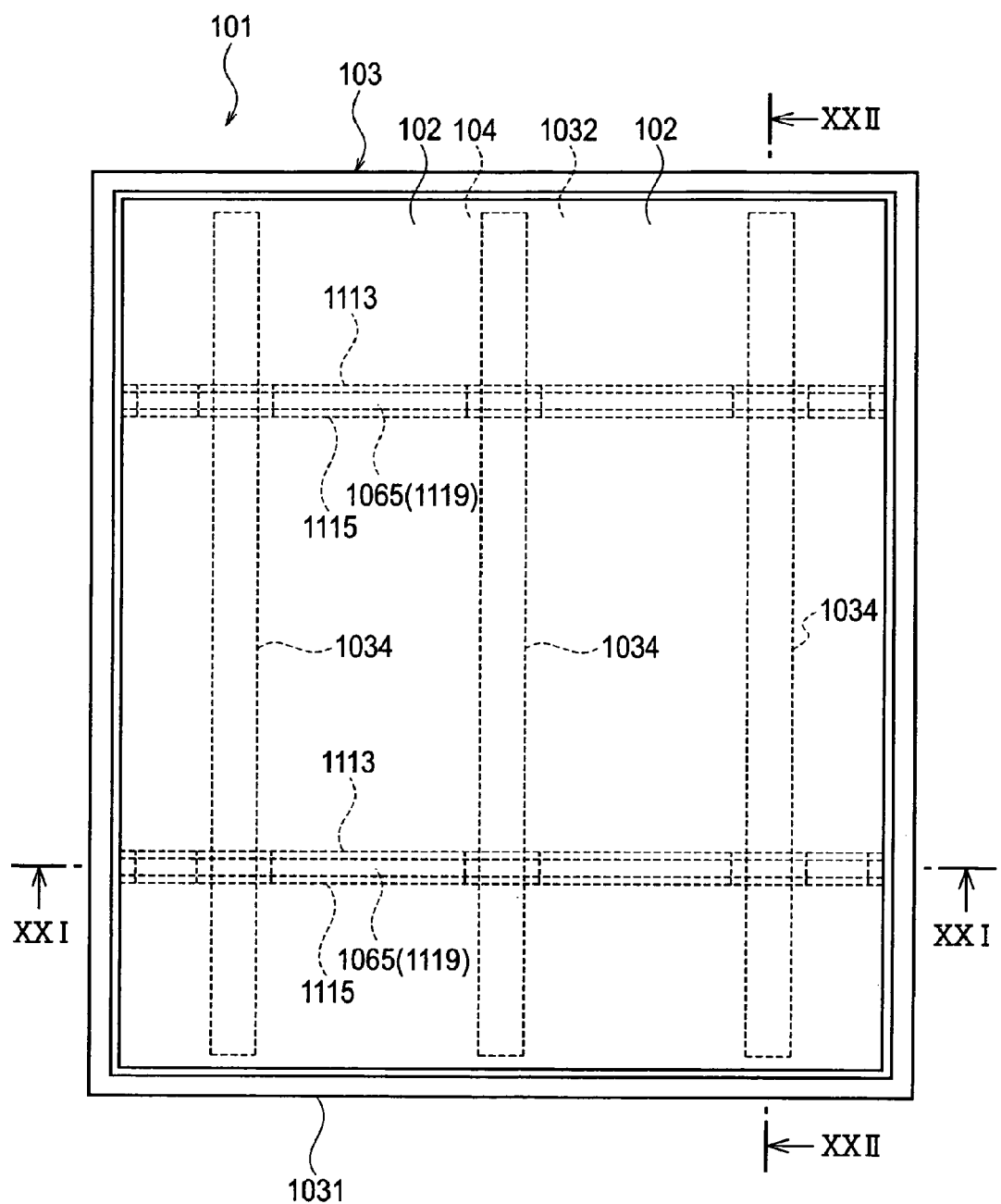
FIG. 20 is a front view of a liquid crystal display in which the diffuser plate shown in FIG. 7 is provided with reinforcing members.
Figure 21:
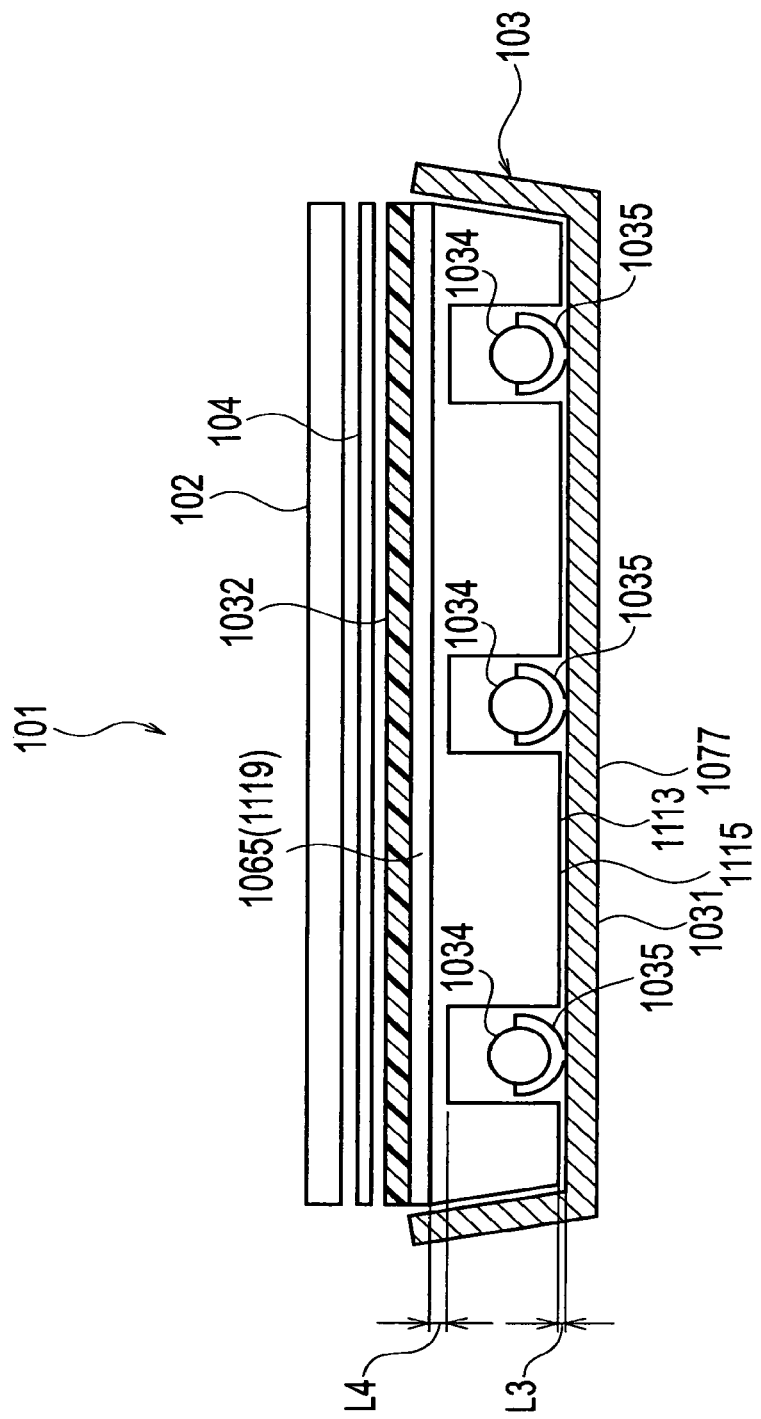
FIG. 21 is a cross-sectional diagram due to a line XXI-XXI shown in FIG. 20.
Figure 23A:
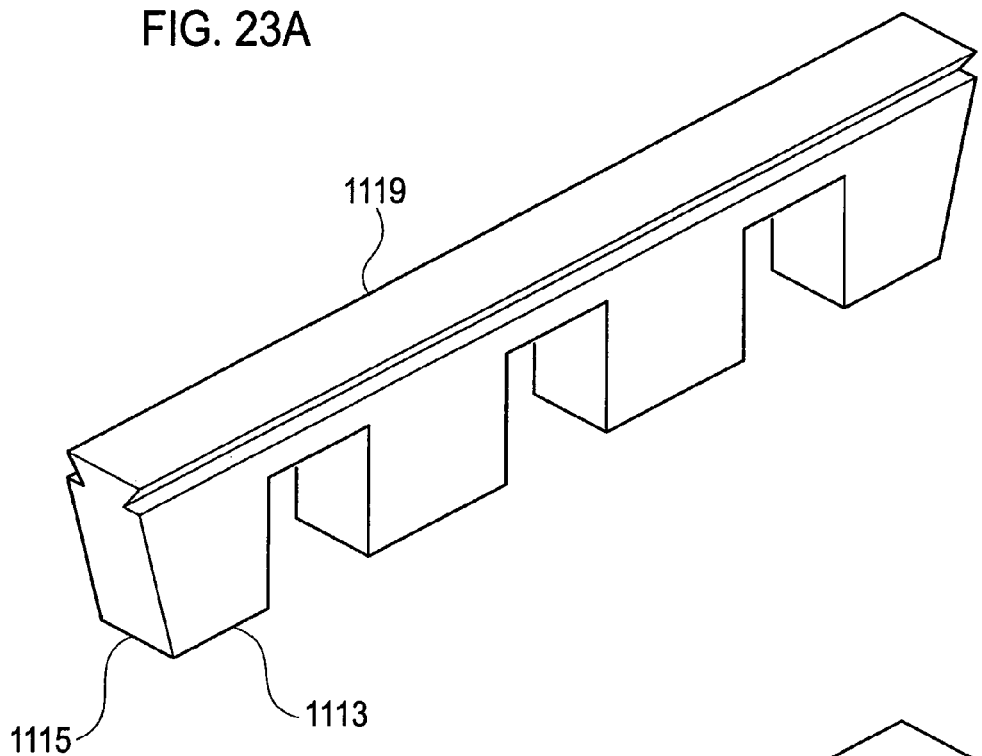
FIGS. 23A and 23B are perspective views of the reinforcing member shown in FIG. 20.
Figure 23B:
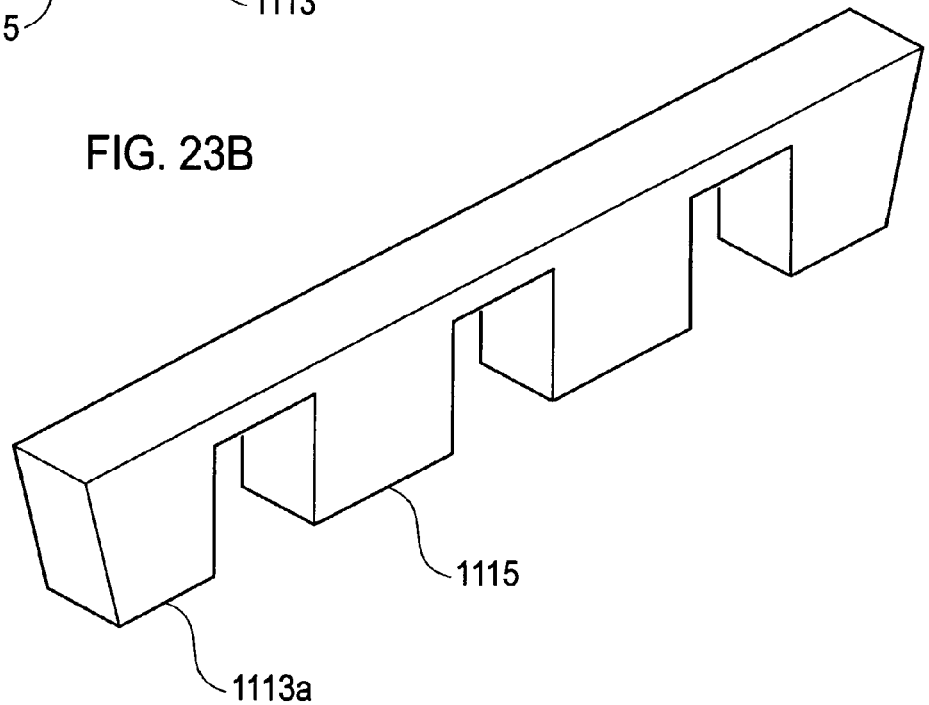

FIG. 20 is a front view of the liquid crystal display 101 including the diffuser plate 1032 provided with the reinforcing members 1113. FIG. 21 is a cross-sectional diagram due to a line XXI-XXI in FIG. 20. FIG. 22 is a cross-sectional diagram due to a line XXII-XXII in FIG. 20. FIG. 23A is a perspective view of a reinforcing member 1113 shown in FIG. 20. FIG. 23B is a perspective view of a reinforcing member 1113a in which an engagement portion 1119 formed in an isosceles trapezoid shape is removed from the reinforcing member 1113. The reinforcing member 1113a is attached on the back surface of the diffuser plate 1032 using an adhesive agent or a double-faced tape having a function of optical coupling agent.

It is noted that the liquid crystal display 101 shown in FIGS. 21 and 22 includes the backlight device 103 which does not have a reflector member because the backlight device 103 has the housing 1031 of which an inner surface is a reflection portion. However, the backlight device 103 shown in FIGS. 21 and 22 may have the reflector member 1033 as well as the backlight device 103 shown in FIG. 7.

In the backlight device 103 shown in FIGS. 20 to 22, the reinforcing members 1113 are engaged to the diffuser plate 1032, which reinforces the diffuser plate 1032 to increase flexural rigidity of the diffuser plate 1032. As the above-described, the diffuser plate 1032 is mounted to the housing 1031 using the supporting members 105 (not shown in FIGS. 20 to 22).

Each reinforcing member 1113 is made of transparent material such as acrylic resin and formed in an elongated cuboidal shape, and functions as a rib of the diffuser plate 1032. More specifically, a longitudinal direction of the reinforcing member 1113 extends in one direction of an in-plane direction of the diffuser plate 1032 (e.g., a width direction of the diffuser plate 1032 which is a direction perpendicular to a longitudinal direction of the CCFLs 1034). One end portion (engagement portion 1119) in a height direction of the reinforcing member 1113 is engaged to the recessed portion 1065 such that the reinforcing member 1113 is integrally mounted to the diffuser plate 1032. The other end portion (first rib 1115) in the height direction of the reinforcing member 1113 is slightly away from the housing 1031 (see a distance L3 illustrated in FIG. 21).

Each reinforcing member 1113 may be loosely mounted to the diffuse plate 1032. More specifically, in a situation where the reinforcing member 1113 is mounted to the diffuse plate 1032, the reinforcing member 1113 is restrained from moving in the height direction (vertical direction in FIG. 21) and a thickness direction (a direction perpendicular to a plane of paper in FIG. 21) thereof with respect to the diffuser plate 1032, and is allowed to slightly move in the longitudinal direction (horizontal direction in FIG. 21) thereof with respect to the diffuser plate 1032. Namely, the reinforcing member 1113 is allowed to move in the longitudinal direction thereof with respect to the diffuser plate 1032, with resistance from the diffuser plate 1032.

Instead of the supporting members 105, the reinforcing members 1113 may have a function as the supporting members 105. More specifically, a value of the distance L3 illustrated in FIG. 21 is set to "0", which allows the other end portion of each reinforcing member 1113 to be integrally mounted to the housing 1031.

In the case where the reinforcing members 1113 have a function as the supporting members 105, as well as each supporting member 105, each reinforcing member 1113 may support the diffuser plate 1032 to restrain the diffuser plate 1032 from moving in the thickness direction of the diffuser plate 1032 and allow the diffuser plate 1032 to slightly move in an in-plane direction of the diffuser plate 1032.

As described the above, each reinforcing member 1113 is mounted on the back surface of the diffuser plate 1032 such that the reinforcing member 1113 extends in a direction intersecting with the longitudinal direction of the CCFLs 1034 (e.g., the direction perpendicular to the longitudinal direction of the CCFLs 1034). A protruding length (protruding height) of the first rib 1115 protruding from the diffuser plate 1032 is relatively small in regions adjacent to the CCFLs 1034 and relatively large in regions away from the CCFLs 1034. For example, a protruding length L4 shown in FIG. 21 is about 1 mm in the regions adjacent to the CCFLs 1034.

The reinforcing members 1113 are arranged at intervals of 100 mm (in the vertical direction of FIG. 20). The intervals and the number of the reinforcing members 1113 are determined while deflection of the diffuser plate 1032 and visibility are identified.

According to the backlight device 103, a protruding length (protruding height) of the first rib 1115 protruding from the diffuser plate 1032 is relatively small in regions adjacent to the CCFLs 1034 and relatively large in regions away from the CCFLs 1034. This increases rigidity of the diffuser plate 1032 to improve arrangement accuracy of the diffuser plate 1032, which prevents luminance on the diffuser plate 1032 from lacking in uniformity.

Figure 25:
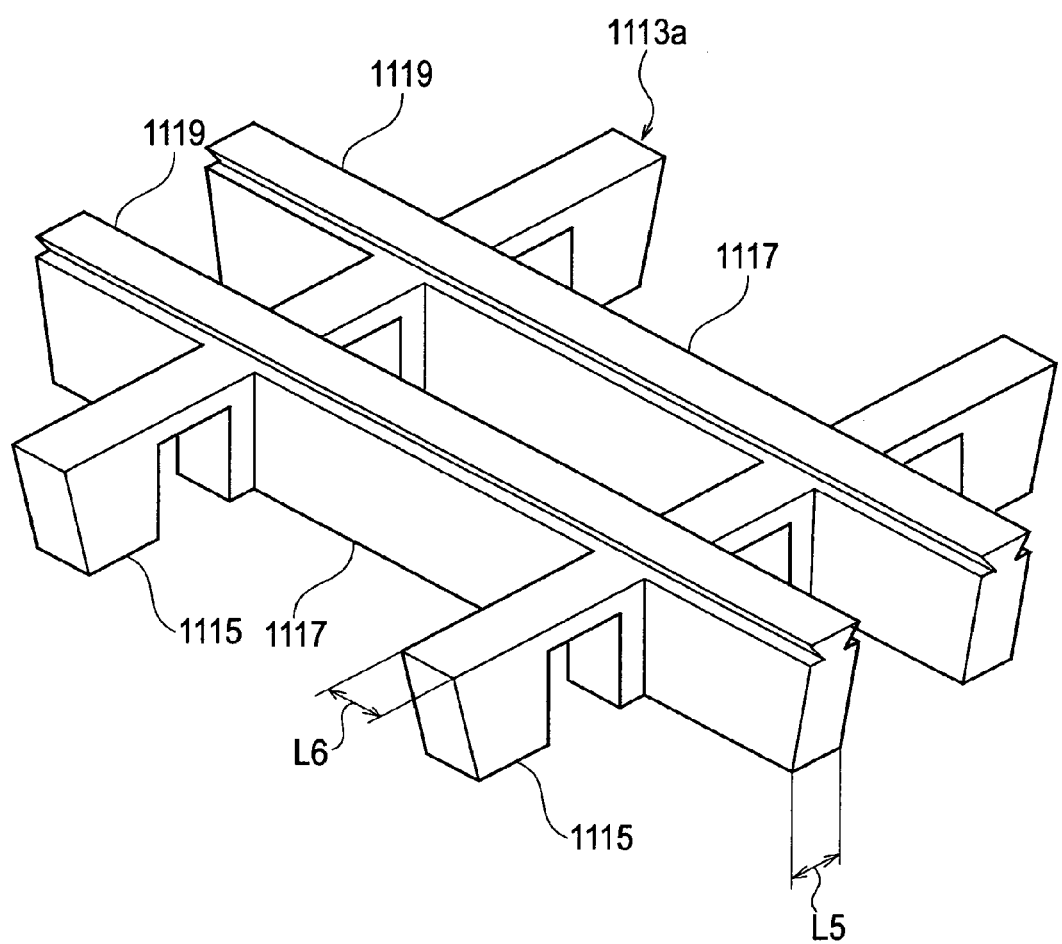
FIG. 25 is a perspective view of the lattice-shaped reinforcing members shown in FIG. 24.
Figure 26:
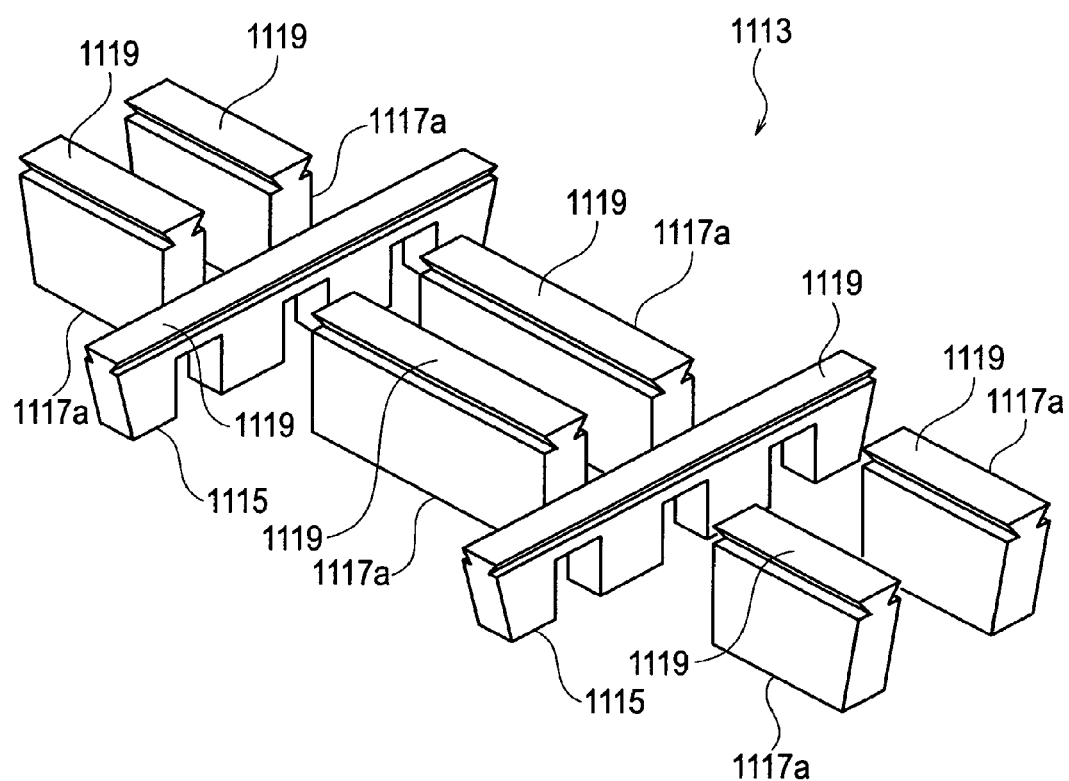
FIG. 26 is a perspective view of a modification of the lattice-shaped reinforcing members shown in FIG. 24.

As shown in FIGS. 24 and 25, instead of the reinforcing members 1113, a grid reinforcing member 1113a may be mounted to the diffuser plate 1032. More specifically, the grid reinforcing member 1113a includes a plurality of first ribs 1115, a plurality of second ribs 1117 and a plurality of engagement portions 1119. Each first rib 1115 extends in the direction perpendicular to the longitudinal direction of the CCFLs 1034. Each second rib 1117 extends in the longitudinal direction of the CCFLs 1034. The first ribs 1115 and the second ribs 1117 are integrally formed by injection molding. The engagement portions 1119 have isosceles trapezoid cross-sections and are respectively mounted on one ends in a height direction of the second ribs 1117. The engagement portions 1119 are respectively engaged to the recessed portions 1065 of the diffuser plate 1032.

The engagement portions 1119 may be respectively mounted on one ends in the height direction of the first ribs 1115 instead of the second ribs 1117.

Figure 27:
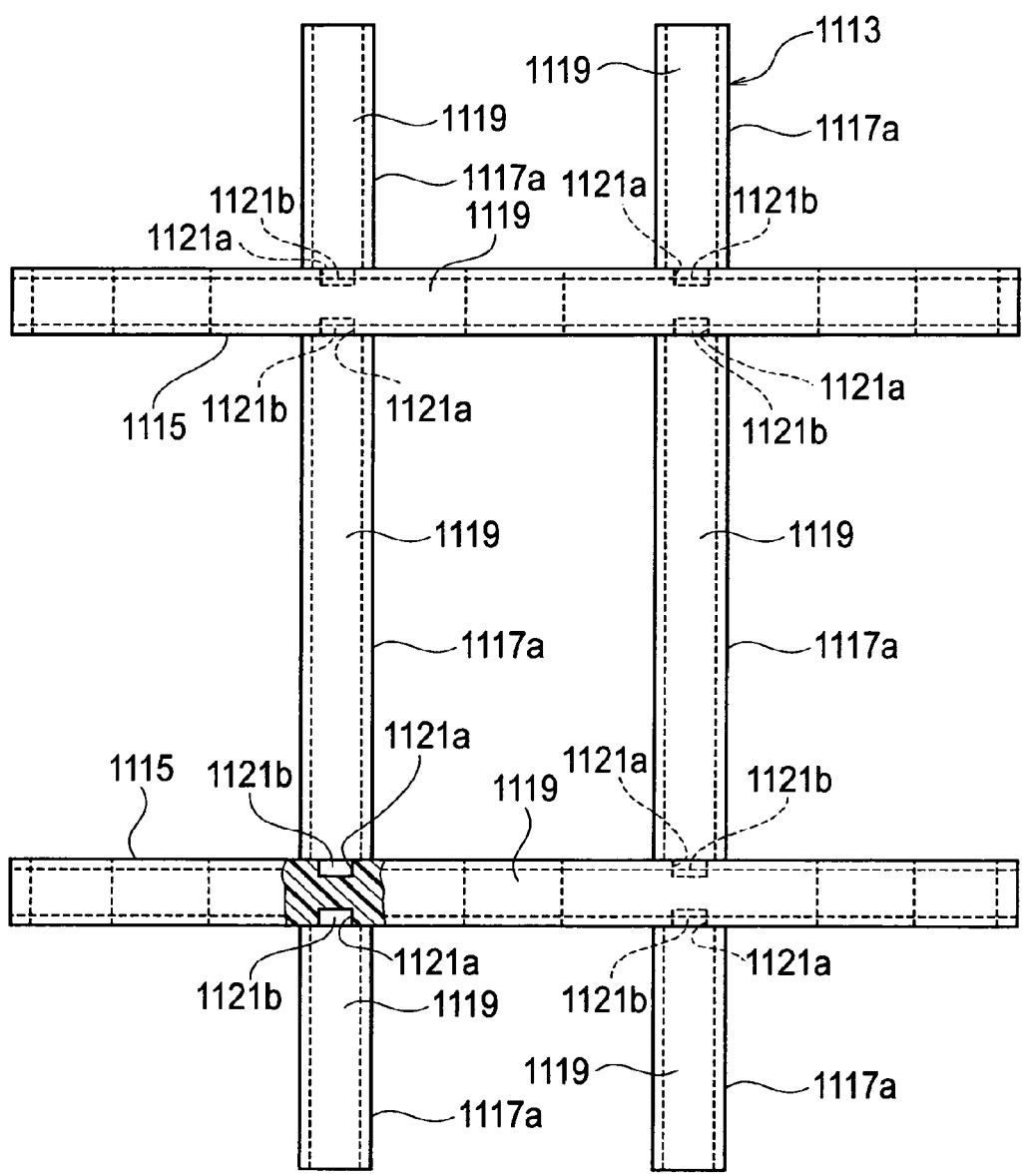
FIG. 27 is a front view of a modification of the lattice-shaped reinforcing members shown in FIG. 24.

The engagement portions 1119 may be respectively mounted on one ends in the height direction of the first ribs 1115 and the second ribs 1117. In this case, in order to assemble the first ribs 1115 and the second ribs 1117 to the diffuser plate 1032, the first ribs 1115 and the second ribs 1117 are separated each other and each second rib 1117 is separated into a plurality of sub-second ribs 1117a. As shown in FIG. 27, a rectangular concave portion 121a is formed at a connection portion of each first rib 1115 where the first rib 1115 is connected to each sub-second rib 1117a, and a rectangular convex portion 121b is formed at a connection portion of each sub-second rib 1117a where the sub-second rib 1117a is connected to each first rib 1115.

For example, a thickness L4 of the first rib 1115 is about 1 mm in the regions adjacent to the CCFLs 1034 in order to reduce deflection of the diffuser plate 1032 due to own weight of the diffuser plate 1032 and reduce weight of the diffuser plate 1032 (see FIG. 21).

As shown in FIG. 22, the recessed portions 1065 of the diffuser plate 1032 and the engagement portions 1119 of the reinforcing members 1113 or the grid reinforcing member 1113a may be formed in a rectangular cross-section instead of an isosceles trapezoid cross-section.

When the reinforcing members 1113 shown in FIG. 23B are attached to the diffuser plate 1032 on which the recessed portions 1065 are not formed using an adhesive agent or a double-face tape, it is necessary to place the reinforcing members 1113 on the diffuser plate 1032 in a correct position. In view of the above, markings 1125 may be printed on the diffuser plate 1032 on which the dots 1063 are formed (see FIG. 29).

The second ribs 1117 parallel to the CCFLs 1034 are relatively thin to have a thickness L5 (see FIG. 25). The first ribs 1115 perpendicular to the CCFLs 1034 are thicker than the second ribs 1117 to have a thickness L6 (see FIG. 25) because the protruding length (protruding height) L4 of each first rib 1115 is relatively small in regions adjacent to the CCFLs 1034.

There are the optical sheets 104 for improving a view angle between the liquid crystal panel 102 and the diffuser plate 1032. The optical sheets 104 need to have a certain degree of flatness. If there is a large degree of unevenness on the optical sheets 104, there is a possibility that luminance on the diffuser plate 1032 lacks in uniformity to deteriorate quality of the liquid crystal display 101. In view of the above, the reinforcing members 1113 are mounted on the back surface side of the diffuser plate 1032.

It is preferable that the light blocking dots 1063 are printed on a surface of the diffuser plate 1032 opposed to the CCFLs 1034 to effectively obtain light blocking effect. Therefore, the dots 1063 and the markings 125 are printed on the surface of the diffuser plate 1032 on which the reinforcing members 1113 are mounted. It is necessary that the reinforcing members 1113 are made of transparent material to prevent luminance on the diffuser plate 1032 from lacking in uniformity. Since the diffuser plate 1032 is made of a milky-white rectangular synthetic resin, the material of which the reinforcing members 1113 are made is independent of that of which the diffuser plate 1032 is made. Therefore, the reinforcing members 1113 are fixed to the diffuser plate 1032 using the recessed portion 1065 or an adhesive agent or a double-faced tape.

It is preferable that a height of second rib 1117 (a protruding length from the diffuser plate 1032) is set as large as possible to increase rigidity thereof. Although it is preferable that the height of second rib 1117 is the same as a distance (9 mm) between the diffuser plate 1032 and the housing 1031, the height of second rib 1117 is set to a value slightly smaller than 9 mm in view of a margin of assembly error (see FIG. 24).

Under a condition where the CCFLs 1034 are arranged at intervals of 23 mm, if the thickness L5 of second rib 1117 made of transparent is more than 10 mm, a region where the second rib 1117 is mounted is darker than a region of surrounding second rib 1117, which reduces visibility. In view of the above, the thickness L5 of second rib 1117 is set to 9 mm (see FIG. 24). Although a length (in a longitudinal direction) of second rib 1117 is the same as one (in a depth direction) of the diffuser plate 1032, it is preferable that the length of second rib 1117 is set as long as possible without interfering with the assembly. Each second rib 1117 lies halfway between adjacent CCFLs 1034. This position is a region where a light blocking area of the diffuser plate 1032 is the smallest. Each second rib 1117 extends in parallel to the adjacent CCFLs 1034 such that the longitudinal direction of second rib 1117 is parallel to one of the adjacent CCFLs 1034.

The thickness L4 of first rib 1115 is set to 1 mm within a range of 5 mm from a portion located just above the center of each CCFL 1034 in a left-hand direction and a right-hand direction of FIG. 24, and set to a value slightly smaller than 9 mm in regions other than the above range. The thickness L6 of first rib 1115 is set to 30 mm. The length (in a longitudinal direction) of first rib 1115 is the same as one (in the width direction) of the diffuser plate 1032.

As well as the supporting members 105, each first rib 1115 and each second rib 1117 are fixed to the diffuser plate 1032 using an adhesive agent (e.g., name of product "SUPER X" made by Cemedine Co., Ltd.) or a double-faced tape having a function as optical coupling agent. In this case, each first rib 1115 and each second rib 1117 are engaged to recessed portions 1065 of the diffuser plate 1032 via the engagement portions 1119 thereof (see FIG. 23A), or are directly engaged to the flat back surface of the diffuser plate 1032 (see FIG. 23B).

In order to engage each first rib 1115 and each second rib 1117 to the diffuser plate 1032 at proper positions, a cut may be formed on at least one of each first rib 1115 and each second rib 1117, and a mark or convex portion may be formed on the diffuser plate 1032. In this case, each first rib 1115 and each second rib 1117 are engaged to the diffuser plate 1032 at proper positions while matching the cut formed on at least one of each first rib 1115 and each second rib 1117 to the mark or convex portion formed on the diffuser plate 1032.

It is preferable that the first ribs 1115 and the second ribs 1117 are assembled in a lattice-like shape and then the assembly is engaged to the diffuser plate 1032 in view of ease of positioning and machine-hour. It is possible to engage one of the first ribs 1115 and the second ribs 1117 to the diffuser plate 1032 and then the other of the first ribs 1115 and the second ribs 1117 to the diffuser plate 1032.

Figure 28:
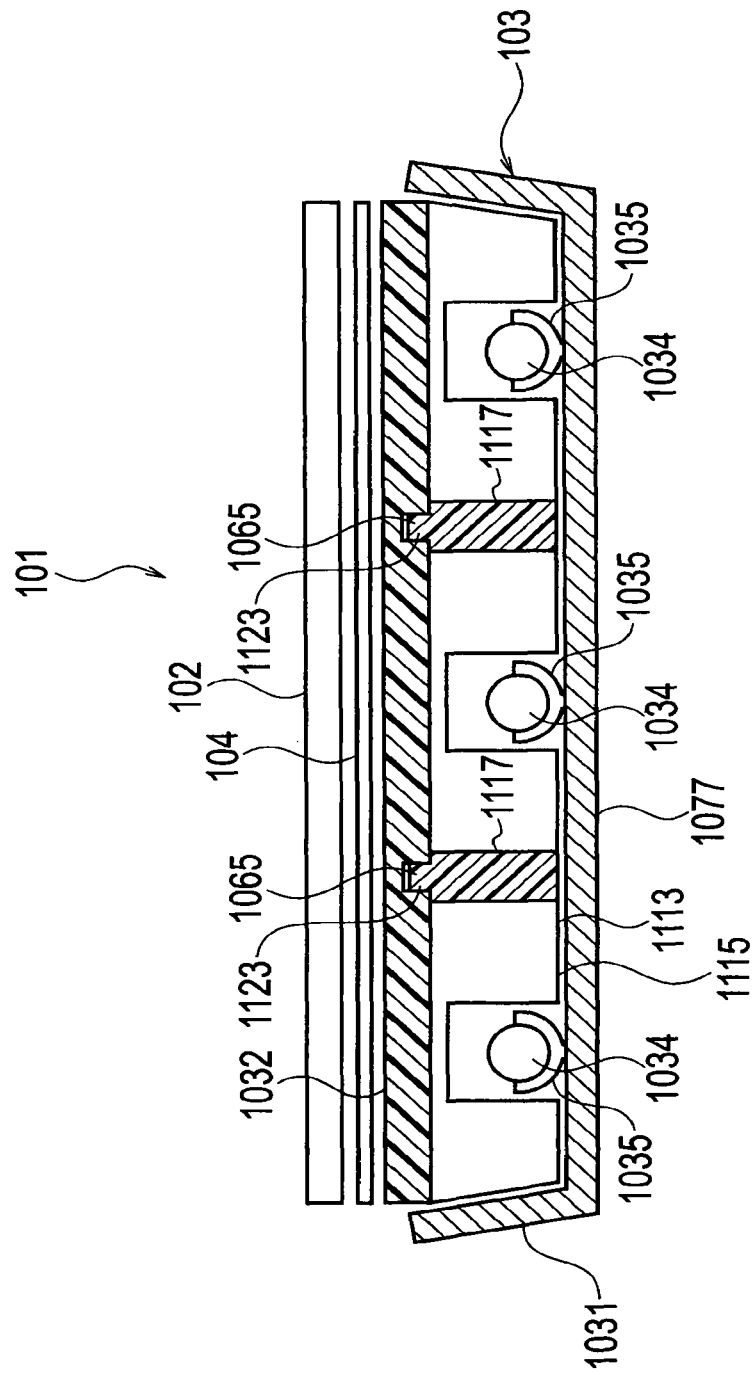
FIG. 28 is a cross-sectional diagram of a modification of the liquid crystal display shown in FIG. 24.
Figure 29:
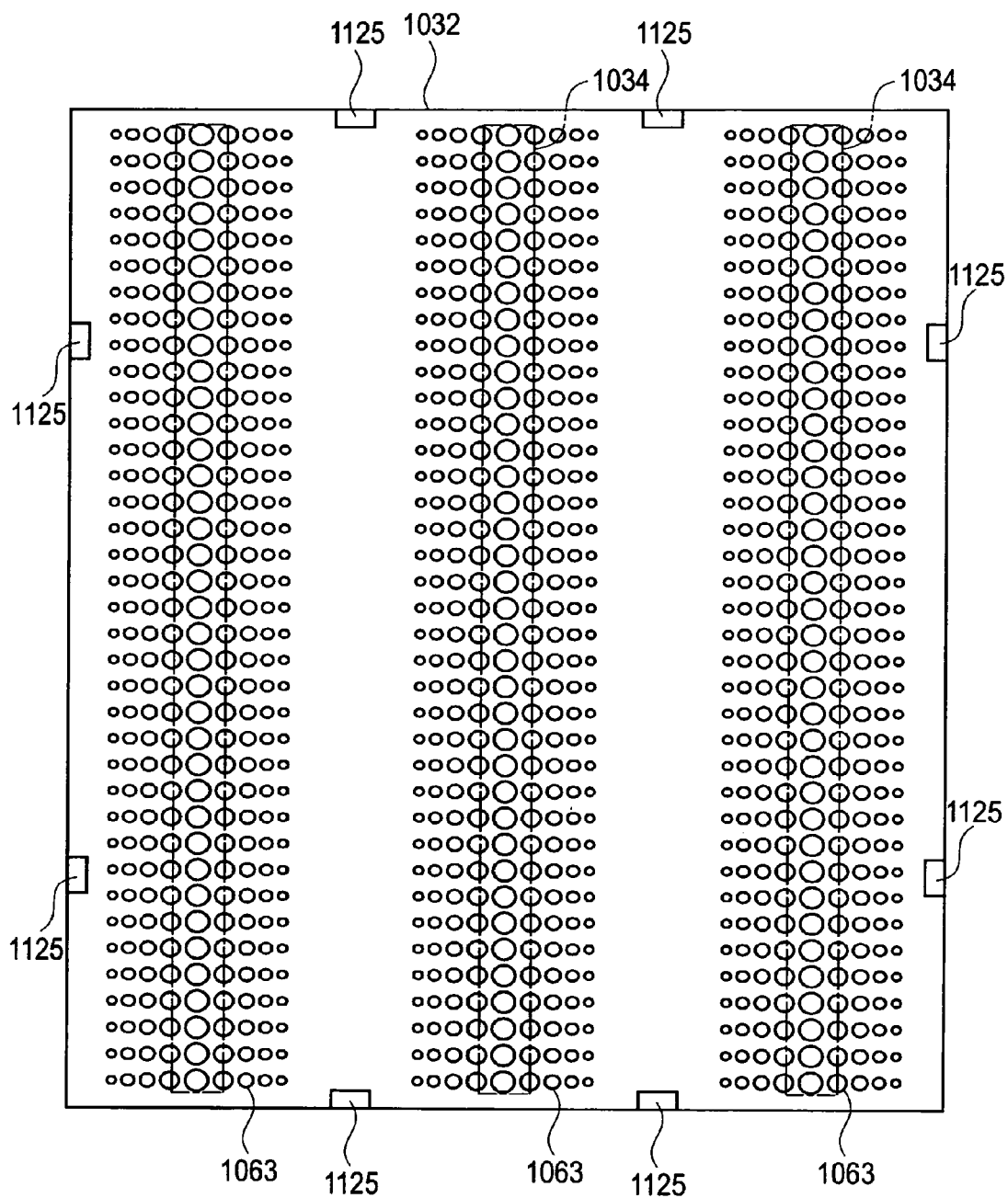
FIG. 29 is a front view of a diffuser plate on which markings are printed and the dot geometries shown in FIG. 19 are formed.

As shown in FIG. 28, engagement portions 1123 may be employed instead of the engagement portions 1119. The engagement portions 1123 have rectangular cross-sections and are respectively mounted on one ends in the height direction of the second ribs 1117. In this case, recessed portions 1065 have slit-like cross-sections (e.g., a width of groove is 1 mm and a depth of groove is 0.5 mm) and are formed on the back surface of the diffuser plate 1032.

As shown in FIG. 30, each first rib 1115 may have the lowest height just above each CCFL 1034, and the height of first rib 1115 may increase as the first rib 1115 departs from the CCFL 1034. In this case, the first ribs 1115 have semi-circular cuts 1127 as viewed from the side of backlight device 103 and the height of each first rib 1115 smoothly varies.

Instead of the recessed portions 1065, protruding portions may be formed on the diffuser plate 1032. In this case, the supporting members 105 and/or the reinforcing members 1113 are engaged to the protruding portions to support and/or reinforces the diffuser plate 1032. The protruding portions are formed when the diffuser plate 1032 is formed by injection molding. The protruding portions and the diffuser plate 1032 are integrally molded. As well as the recessed portions 1065, the protruding portions have elongated shapes, and a cross-section of the protruding portions due to a plane perpendicular to a longitudinal direction of the protruding portions has a certain shape. It is preferable that the protruding portions are formed by two-color injection molding and made of light transmissive material.

What is claimed is:

1. A backlight device comprising:
    a housing that has an open surface and a bottom surface which faces the open surface and has a through hole;
    a light source that is arranged in the housing;
    a diffuser plate that is arranged to close the open surface of the housing, has a recessed portion, and diffuses light emitted from the light source and passing through the diffuser plate; and
    a supporting member that has a fixing portion fitted in the through hole of the housing, an engagement portion engaged to the recessed portion of the diffuser plate, and a main body linking the fixing portion with the engagement portion,
    wherein the recessed portion is formed on a surface of the diffuser plate facing the bottom surface of the housing, and does not penetrate the diffuser plate.

2. The backlight device according to claim 1, wherein the main body of the supporting member is made of light transmissive member.

3. The backlight device according to claim 2, wherein an optical characteristic agent is filled in clearance between the engagement portion of the supporting member and the recessed portion of the diffuser plate.

4. The backlight device according to claim 1, wherein a cross-sectional area of the recessed portion of the diffuser plate at the open surface side of the housing is larger than a cross-sectional area of the recessed portion at the bottom surface side of the housing is larger than a cross-sectional area of the recessed portion at the bottom surface side of the housing.

5. The backlight device according to claim 1, wherein the light source is a line light source,
    the supporting member extends in a direction which intersects with the light source and is mounted at the light source side of the diffuser plate, and
    a protruding length of the supporting member from the diffuser plate is relatively small in a region adjacent to the light source and relatively large in a region away from the light source.

6. A liquid crystal display comprising:
    a backlight device comprising:
        a housing that has an open surface and a bottom surface which faces the open surface and has a through hole;
        a light source that is arranged in the housing;
        a diffuser plate that is arranged to close the open surface of the housing, has a recessed portion, and diffuses light emitted from the light source and passing through the diffuser plate; and
        a supporting member that has a fixing portion fitted in the through hole of the housing, an engagement portion engaged to the recessed portion of the diffuser plate, and a main body linking the fixing portion with the engagement portion,
    wherein the recessed portion is formed on a surface of the diffuser plate facing the bottom surface of the housing, and does not penetrate the diffuser plate.

7. The backlight device according to claim 6, wherein the main body of the supporting member is made of light transmissive member.

8. The backlight device according to claim 7, wherein an optical characteristic agent is filled in clearance between the engagement portion of the supporting member and the recessed portion of the diffuser plate.

9. The backlight device according to claim 6, wherein a cross-sectional area of the recessed portion of the diffuser plate at the open surface side of the housing is larger than a cross-sectional area of the recessed portion at the bottom surface side of the housing.

10. The backlight device according to claim 6, wherein the light source is a line light source, the supporting member extends in a direction which intersects with the light source and is mounted at the light source side of the diffuser plate, and a protruding length of the supporting member from the diffuser plate is relatively small in a region adjacent to the light source and relatively large in a region away from the light source.

* * * * *

UNITED STATES PATENT AND TRADEMARK OFFICE
CERTIFICATE OF CORRECTION

| | | |
|---|---|---|
| PATENT NO. | : 8,659,720 B2 | Page 1 of 1 |
| APPLICATION NO. | : 13/459738 | |
| DATED | : February 25, 2014 | |
| INVENTOR(S) | : Tsuyoshi Sasaki et al. | |

It is certified that error appears in the above-identified patent and that said Letters Patent is hereby corrected as shown below:

In the Claims

- Claim 4, Column 26, Line 25, after "housing"

Delete "is larger than a cross-sectional area of the recessed portion at the bottom surface side of the housing"

Signed and Sealed this
Twenty-fourth Day of June, 2014

Michelle K. Lee
*Deputy Director of the United States Patent and Trademark Office*